United States Patent
Yamada et al.

(10) Patent No.: US 9,962,305 B2
(45) Date of Patent: May 8, 2018

(54) LIVING SUPPORT SYSTEM AND LIVING SUPPORT METHOD

(71) Applicant: Panasonic Corporation, Osaka (JP)

(72) Inventors: Kazunori Yamada, Aichi (JP); Yoji Yamada, Aichi (JP); Pei Di, Aichi (JP)

(73) Assignee: PANASONIC CORPORATION, Osaka (JP)

(*) Notice: Subject to any disclaimer, the term of this patent is extended or adjusted under 35 U.S.C. 154(b) by 0 days. days.

(21) Appl. No.: 14/977,338

(22) Filed: Dec. 21, 2015

(65) Prior Publication Data

US 2016/0199238 A1 Jul. 14, 2016

(30) Foreign Application Priority Data

Jan. 9, 2015 (JP) ................. 2015-003693

(51) Int. Cl.
*G05B 15/00* (2006.01)
*A61G 5/14* (2006.01)
(Continued)

(52) U.S. Cl.
CPC ............ *A61G 5/14* (2013.01); *A47C 7/56* (2013.01); *A47C 7/62* (2013.01); *B25J 9/0003* (2013.01);
(Continued)

(58) Field of Classification Search
CPC .. A61G 5/14; A61G 2203/32; A61G 2203/42; A61G 2203/70; A61G 7/1038;
(Continued)

(56) References Cited

U.S. PATENT DOCUMENTS 5,172,147 A * 12/1992 Rockhill ............... A61F 4/00
396/428
5,203,609 A * 4/1993 Stoeckl ............... A61G 15/02
297/330

(Continued)

FOREIGN PATENT DOCUMENTS

JP 2011-010874 1/2011
JP 2011-217858 11/2011
(Continued)

*Primary Examiner* — Khoi H Tran
*Assistant Examiner* — Jorge O Peche
(74) *Attorney, Agent, or Firm* — Greenblum & Bernstein, P.L.C.

(57) ABSTRACT

A living support system connected to a chair including a movable seat through a communication network includes a robot including a main body, a moving device that moves the main body in a freestanding state, a handle provided at the main body and gripped by a user, and a handle load detector that detects a handle load applied to the handle by the user; a support control device that controls seat movement for a stand-up motion of the sitting user, using the detected handle load; and a communicator that transmits support control information including a movement speed at which the chair moves the movable seat, to the chair through the communication network. The support control device includes a seat speed calculator that calculates a speed at which the movable seat is inclined with respect to a floor on which the chair is placed, as the movement speed using the detected handle load.

24 Claims, 19 Drawing Sheets

(51) Int. Cl.
  *A47C 7/56* (2006.01)
  *A47C 7/62* (2006.01)
  B25J 9/00 (2006.01)
  B25J 9/16 (2006.01)

(52) U.S. Cl.
  CPC ......... *B25J 9/1679* (2013.01); *A61G 2203/32* (2013.01); *A61G 2203/42* (2013.01); *A61G 2203/70* (2013.01); *Y10S 901/46* (2013.01)

(58) Field of Classification Search
  CPC ......... A47C 7/62; B25J 9/0003; B25J 9/1679; Y10S 901/01; Y10S 901/46
  See application file for complete search history.

(56) References Cited

U.S. PATENT DOCUMENTS

| | | | | |
|---|---|---|---|---|
| 5,331,851 | A * | 7/1994 | Parviainen | A61B 5/0488 482/133 |
| 5,484,188 | A * | 1/1996 | Stoeckl | A61G 15/02 297/217.3 |
| 6,742,206 | B1 * | 6/2004 | Han | A61G 5/006 280/250.1 |
| 7,601,104 | B2 * | 10/2009 | Agrawal | A61G 5/14 482/69 |
| 8,915,871 | B2 * | 12/2014 | Einav | A61B 5/1116 601/24 |
| 9,393,698 | B1 * | 7/2016 | Vo | A61G 5/04 |
| 9,669,549 | B2 * | 6/2017 | Suzuki | A61G 7/1017 |
| 9,700,472 | B2 * | 7/2017 | Gierse | A61G 5/1059 |
| 2003/0019684 | A1 * | 1/2003 | Wucherpfennig | A63B 71/0009 180/330 |
| 2005/0186533 | A1 * | 8/2005 | Cohen | A61C 1/082 433/98 |
| 2006/0277074 | A1 * | 12/2006 | Einav | G16H 10/60 705/3 |
| 2008/0004526 | A1 * | 1/2008 | Gross | A61B 8/0825 600/437 |
| 2008/0007103 | A1 * | 1/2008 | Welles | A61B 5/11 297/330 |
| 2008/0010748 | A1 * | 1/2008 | Menkedick | A61B 5/1115 5/600 |
| 2008/0132383 | A1 * | 6/2008 | Einav | A61H 1/02 482/8 |
| 2010/0045088 | A1 * | 2/2010 | Kunou | A47C 7/62 297/354.1 |
| 2016/0159253 | A1 * | 6/2016 | Frasher | B60N 2/10 296/65.01 |
| 2016/0346599 | A1 * | 12/2016 | Dalebout | A63B 22/06 |
| 2017/0008164 | A1 * | 1/2017 | Lee | B25J 9/0006 |
| 2017/0128292 | A1 * | 5/2017 | Tsusaka | A61G 5/14 |
| 2017/0128293 | A1 * | 5/2017 | Tsusaka | A61G 5/14 |

FOREIGN PATENT DOCUMENTS

| | | | |
|---|---|---|---|
| JP | 2012-200409 | | 10/2012 |
| JP | 2012217686 | A * | 11/2012 |
| JP | 2012217686 | A * | 11/2012 |
| WO | WO 2015011839 | A1 * | 1/2015 ........... A61G 7/1019 |
| WO | WO-2015011839 | A1 * | 1/2015 ........... A61G 7/1019 |

* cited by examiner

LIVING SUPPORT SYSTEM AND LIVING SUPPORT METHOD

BACKGROUND

1. Technical Field

The present disclosure relates to a living support system and a living support method that support a stand-up motion of a user sitting on a chair.

2. Description of the Related Art

In recent years in which the number of elderly people rises while the birthrate falls in developed countries, the need for watching and living support for the elderly people increase. In particular, elderly people may have difficulty in keeping the quality of life (QOL) for living at home due to degradation in physical ability with increasing age. To prevent the elderly people from getting Sarcopenia etc. and to keep the physical ability, it is important to keep the muscle mass by continuing an exercise by a certain amount or more. However, the elderly people who have difficulty in going out due to the degradation in physical ability and hence likely stay at home may be caught in a vicious cycle that keeping a certain amount of exercise is difficult and the muscle mass is more decreased.

In recent years, regarding such the situation, there are suggested various devices that support a stand-up motion from a chair which is the starting point of living action.

For example, Japanese Unexamined Patent Application Publication No. 2012-200409 discloses a stand-up motion assisting robot in which a support unit of the robot assists a stand-up motion of a user sitting on a chair by following the movement of the chest of the user. The stand-up motion assisting robot with such a configuration can assist the stand-up motion of the user only with the assisting robot.

Also, for example, Japanese Unexamined Patent Application Publication No. 2011-10874 discloses a dental treatment chair that assists a stand-up motion of a patient by elevating a pad part supporting the elbow of the patient obliquely upward. The dental treatment chair with such a configuration can assist the stand-up motion of the patient only with the chair.

SUMMARY

In one general aspect, the techniques disclosed here feature a living support system connected to a chair including a movable seat through a communication network including a robot including a main body, a moving device that moves the main body in a freestanding state, a handle provided at the main body and configured to be gripped by a user, and a handle load detector that detects a handle load applied to the handle by the user; a support control device that controls movement of the movable seat for a stand-up motion of the user sitting on the chair, on the basis of the detected handle load; and a communicator that transmits support control information including a movement speed at which the chair moves the movable seat, to the chair through the communication network. The support control device includes a seat speed calculator that calculates a speed at which the seat is inclined with respect to a floor on which the chair is placed, as the movement speed on the basis of the detected handle load.

With the living support system of the present disclosure, in standing up from the chair serving as the starting point of living action, a burden on the body of a user can be decreased, and smooth posture transition of the user can be provided.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
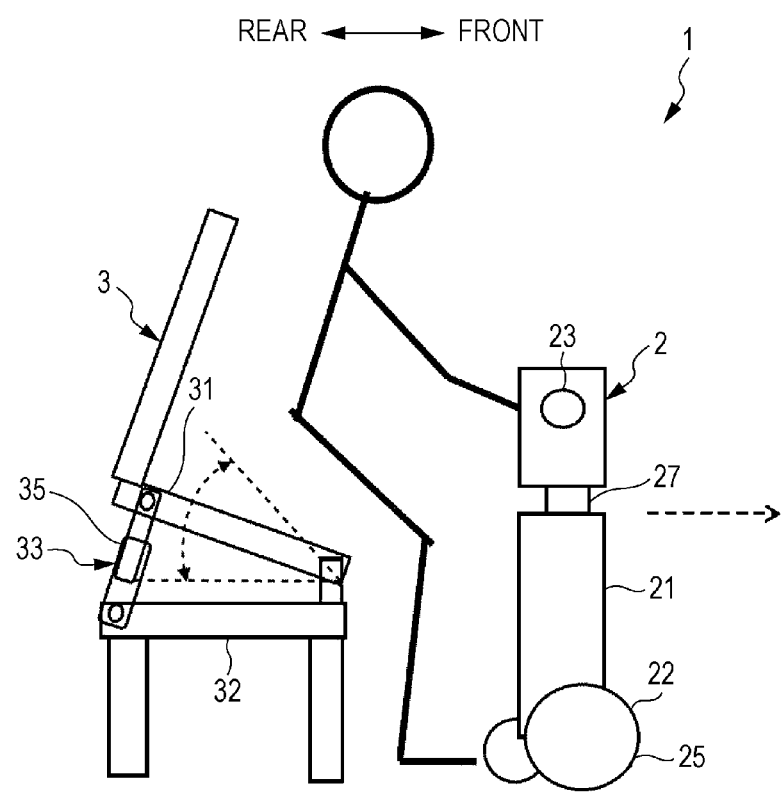
FIG. 1 is a schematic view showing major configurations of a stand-up support robot and a stand-up support chair according to a first embodiment.

Underlying Knowledge Forming Basis of the Present Disclosure

The devices disclosed in Japanese Unexamined Patent Application Publication No. 2012-200409 and No. 2011-10874 each support the stand-up motion only with the function of the robot or chair. Hence, in viewpoint of smooth posture transition in stand-up motion, the devices still have a margin for improvement.

Accordingly, to address the above-described problems of related art, the present disclosure provides a living support system, a living support device, and a living support method that provide stand-up support that can decrease a burden on the body and provide smooth posture transition in standing up from a chair serving as the starting point of living action.

A living support system according to an aspect of the present disclosure is a living support system (a living support device) connected to a chair including a movable seat through a communication network, the system including a robot including
a main body,
a moving device that moves the main body in a freestanding state,
a handle provided at the main body and configured to be gripped by a user, and
a handle load detector that detects a handle load applied to the handle by the user;
a support control device that controls movement of the movable seat for a stand-up motion of the user sitting on the chair, on the basis of the detected handle load; and
a communicator that transmits support control information including a movement speed at which the chair moves the movable seat, to the chair through the communication network, and
the support control device includes a seat speed calculator that calculates a speed at which the seat is inclined with respect to a floor on which the chair is placed, as the movement speed on the basis of the detected handle load.

The support control device may further include
a relative position calculator that calculates a relative position of the robot with respect to the chair; and
a support availability determiner that determines that stand-up support is available if the relative position calculated by the relative position calculator is located at a previously set support position,
if the support availability determiner determines that the robot is located at the support position, the communicator may transmit the support control information including the movement speed calculated by the seat speed calculator to the chair.

If the support availability determiner determines that the robot is located at the support position, the communicator may receive seat load information, from the chair, which includes a seat load which is applied to the seat by the user and detected by the chair, and the support control device may lock movement of the moving device if the seat load included in the received seat load information is larger than the previously set seat load, and the support control device may unlock the movement of the moving device if the seat load included in the seat load information becomes equal to or smaller than the previously set seat load.

If the support availability determiner determines that the robot is located at the support position, the communicator may receive seat load information, from the chair, which includes a seat load which is applied to the movable seat by the user and detected by the chair, and the support control device may lock movement of the moving device at the support position, calculates a gravity center position of the user on the basis of the handle load detected by the handle load detector and the seat load included in the seat load information, and the support control device may unlock the movement of the moving device if the gravity center position satisfies a previously set first set condition.

The support control device may cause the moving device to move the main body in a direction away from the chair in accordance with the gravity center position after the movement is unlocked.

The robot may further include
a posture information acquirer that acquires posture information of the user sitting on the chair,
the support control device may correct the support position on the basis of the posture information of the user input from the posture information acquirer.

If the support availability determiner determines that the robot is located at the support position, the communicator may receive seat load information, from the chair, which includes a seat load which is applied to the movable seat by the user and which is detected by the chair, and the seat speed calculator may calculate the movement speed of the sheet on the basis of the handle load and the seat load included in the received seat load information.

The seat speed calculator may calculate a value that is proportional to the handle load, as the movement speed.

If the support availability determiner determines that the robot is located at the support position, the communicator may receive seat load information, from the chair, which includes a seat load which is applied to the movable seat by the user and which is detected by the chair, the seat control device may calculate a gravity center position of the user on the basis of information on the handle load and the seat load included in the received seat load information, and the seat speed calculator may calculate the movement speed of the movable seat of the chair so that a movement speed at the gravity center position of the user satisfies a previously set second set condition.

The chair may include a seat moving device that inclines the movable seat forward of the chair, and inclines the movable seat leftward or rightward of the chair, the handle load detector may detect a left handle load applied to a left portion with respect to the center of the handle by the user, and a right handle load applied to a right portion with respect to the center of the handle by the user, the support control device may calculate a gravity center position of the user in a left-right direction of the chair on the basis of the left handle load and the right handle load, and add control information on a seat gradient by which the movable seat is inclined leftward or rightward of the chair so that the gravity center position of the user approaches the center of the robot, to the support control information, and the support control device may cause the seat moving device of the chair to control the seat gradient on the basis of the control information on the seat gradient included in the support control information.

The chair may include a seat moving device that inclines the movable seat forward of the chair, and inclines the movable seat leftward or rightward of the chair, the support control device may add control information on a seat gradient by which the movable seat is inclined leftward or rightward of the chair, to the support control information on the basis of previously set user information, and the support control device may cause the seat moving device of the chair to control the seat gradient on the basis of the control information on the seat gradient in the support control information.

The chair may include a seat moving device that inclines the movable seat forward of the chair, and inclines the movable seat leftward or rightward of the chair, if the support availability determiner determines that the robot is located at the support position, the communicator may receive information, from the chair, on a left-right load balance relating to a load balance of the seat in a left-right direction of the chair detected by the chair, the support control device may calculate a gravity center position of the user in the left-right direction on the basis of the received information on the left-right load balance, and add control information on a seat gradient by which the movable seat is inclined leftward or rightward of the chair so that the gravity center position of the user approaches the center in the left-right direction of the chair, to the support control information, and the support control device may cause the seat moving device of the chair to control the seat gradient on the basis of the control information on the seat gradient in the support control information.

If the support availability determiner determines that the robot is located at the support position, the communicator may receive history information, from the chair, on a seat load which is applied to the movable seat by the user and detected by the chair, the support control device may determine whether the user is sleeping or not on the basis of the received history information, and if the support control device determines that the user is sleeping, the support control device may add a lower movement speed than the movement speed of the movable seat calculated by the seat speed calculator, to the support control information.

The living support system may further include a sense provider that emits a sense signal to the user, if the support availability determiner determines that the robot is located at the support position, the communicator may receive history information, from the chair, on a seat load which is applied to the movable seat by the user and detected by the chair, and the support control device may determine whether the user is sleeping or not on the basis of the received history information, and if the support control device determines that the user is sleeping, the sense provider may emit the sense signal.

The living support system may further include a sense provider that emits a sense signal to the user, the communicator may further receive speed information, from the chair, which includes the movement speed of the movable seat and the sense provider may emit a sense signal corresponding to the movement speed of the seat included in the received speed information.

The living support system may further include a sense provider that emits a sense signal to the user, if the support availability determiner determines that the robot is located at the support position, the communicator may receive seat load information, from the chair, which includes a seat load which is applied to the seat by the user and detected by the chair, and the support control device may calculate a gravity center position of the user on the basis of the handle load and the seat load included in the received seat load information, and the sense provider may emit a sense signal corresponding to a movement speed at the gravity center position of the user.

The handle load detector may detect a handle load in a vertical direction and a handle load in a horizontal direction with respect to a floor on which the robot is arranged, as the handle load applied to the handle, and the support control device may unlock the movement by the moving device and causes the moving device to move the robot in the horizontal direction if the handle load in the horizontal direction detected by the handle load detector is a set value or larger.

The handle load detector may detect a handle load in a vertical direction with respect to a floor on which the robot is arranged, as the handle load applied to the handle, and the support control device may cause the chair to control the movement of the movable seat on the basis of the detected handle load in the vertical direction.

The robot may include the support control device; and the communicator.

The living support system may further include an external device connected to the robot and the chair through the communication network, and the external device may include the support control device and the communicator.

The robot may include a communicator that transmits the detected handle load to the external device, and the support control device may acquire the handle load received by the communicator in the external device from the robot.

The support control device may cause the chair to move the movable seat on the basis of the calculated movement speed included in the transmitted support control information.

A living support method according to an aspect of the present disclosure is a living support method of a living support system connected to a chair including a movable seat through a communication network, the living support system includes a robot having a main body, a moving device that moves the main body in a freestanding state, a handle provided at the main body and configured to be gripped by a user, and a handle load detector that detects a handle load applied to the handle by the user, and the living support method includes controlling movement of the movable seat for a stand-up motion of the user sitting on the chair, on the basis of the handle load detected by the robot;

transmitting support control information including a movement speed at which the chair moves the movable seat, to the chair through the communication network; and in the control on the movement of the movable seat, calculating a speed at which the movable seat is inclined with respect to a floor on which the chair is placed, as the movement speed on the basis of the detected handle load.

A living support system according to an aspect of the present disclosure is a living support system connected to a robot through a communication network including a chair including a seat, a seat moving device that moves the seat, a communicator that receives support control information from the robot through the communication network, and a seat control device that controls movement of the seat by the seat moving device on the basis of the support control information received by the communicator, the support control information includes a speed at which the seat is inclined with respect to a floor on which the chair is placed, as a movement speed at which the seat is moved and which is calculated on the basis of a handle load applied to the handle of the robot by the user, and the seat control device causes the seat moving device to move the seat by causing the seat moving device to incline the seat on the basis of the movement speed included in the support control information.

A living support system according to an aspect of the present disclosure includes a chair having a movable seat;

a robot including a main body, a moving device that moves the main body in a freestanding state, a handle provided at the main body and configured to be gripped by the user, and a handle load detector that detects a handle load applied to the handle; and an external device connected to the robot and the chair through the communication network, the external device includes a support control device that controls movement of the seat for a stand-up motion of the user sitting on the chair, on the basis of the handle load detected by the robot, and a communicator that transmits support control information including a movement speed at which the chair moves the seat, to the chair through the communication network, and the support control device includes a seat speed calculator that calculates a speed at which the seat is inclined with respect to a floor on which the chair is placed, as the movement speed on the basis of the handle load detected by the robot.

The robot may further include a communicator that transmits the detected handle load to the external device, the communicator in the external device may further receive the handle load transmitted from the robot, and the seat speed calculator of the support control device may calculate the speed at which the seat is inclined, as the movement speed on the basis of the received handle load.

A living support method according to an aspect of the present disclosure includes detecting a handle load applied to a handle of a robot having connection with a communication network by a user;

acquiring the detected handle load from the robot;

calculating a speed at which a seat of a chair is inclined, as a movement speed of the seat on the basis of the acquired handle load; and moving the seat of the chair on the basis of the calculated movement speed of the seat and providing support for a stand-up motion of the user sitting on the chair.

Embodiments according to the present disclosure are described below in detail on the basis of the drawings.

First Embodiment

Figure 2:
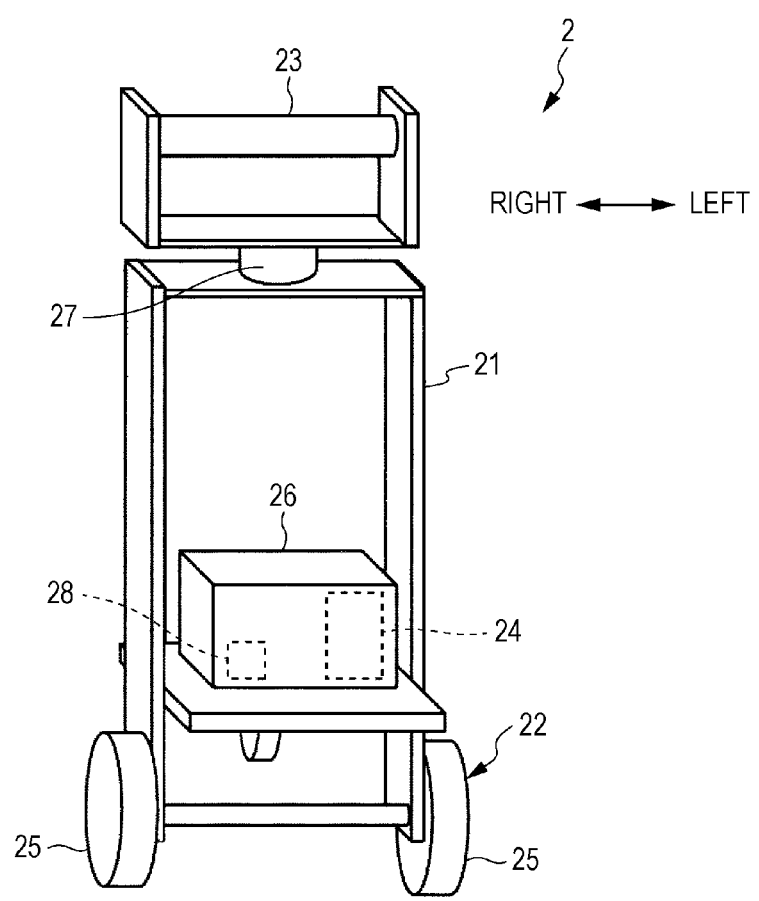
FIG. 2 is an external view of an autonomous mobile robot according to the first embodiment.
Figure 3:
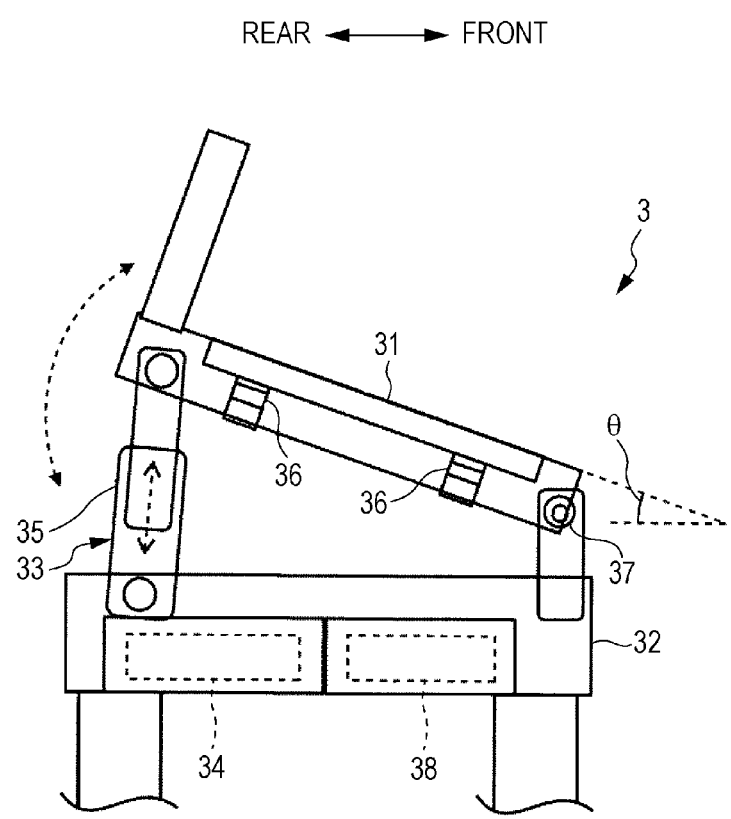
FIG. 3 is an external view of an automatic elevating chair according to the first embodiment.

FIG. 1 shows major configurations of a stand-up support robot and a stand-up support chair according to a first embodiment of the present disclosure. In the first embodiment, a robot 2 is used as the stand-up support robot. For example, an autonomous mobile robot is used as the robot 2. In the first embodiment, an automatic elevating chair is used as a chair 3 corresponding to the stand-up support chair. In the first embodiment, for example, the robot 2 and the chair 3 are connected through a communication network, and hence a stand-up support system 1 being a living support system is formed. Also, FIG. 2 shows an external view of the robot 2, and FIG. 3 shows an external view of the chair 3. In the example shown in FIG. 1, the robot 2 and the chair 3 are arranged on a floor.

Configuration of Autonomous Mobile Robot

As shown in FIGS. 1 and 2, the robot 2 corresponding to the autonomous mobile robot includes a main body 21, a moving device 22 that moves the main body 21 in a freestanding state, a handle 23 configured to be gripped by a user, and a support control device 24.

The main body 21 is formed of a frame having rigidity so that the main body 21 can support other components and support a load applied when a user stands up.

The moving device 22 includes a plurality of wheels 25 provided below the main body 21, and a driver 26 that moves the main body 21 by rotationally driving the wheels. The wheels 25 support the main body 21 in a freestanding state. The wheels 25 are rotationally driven by the driver 26 and hence move the main body 21 in an arrow direction (the front direction or the rear direction) shown in FIG. 1 while keeping the freestanding posture. In this example, the moving device 22 includes the moving mechanism using the wheels 25. However, a moving mechanism (such as a running belt, a roller, or a multi-leg mechanism) other than the wheels may be used.

The handle 23 is provided above the main body 21. The handle 23 is provided in a shape and at a height position that allow the user to easily grip the handle 23 with both hands while the user is sitting and the user is standing.

The support control device 24 creates support control information being information required for stand-up support for the user. The support control device 24 transmits the support control information to the chair 3 through the communication network, and hence controls a support operation for the stand-up support for the user. The support control device 24 also controls a moving operation of the main body 21 by the moving device 22.

The support control device 24 includes, for example, a memory (not shown) that stores a program functioning as the support control device 24, and a processing circuit (not shown) corresponding to a processor such as a central processing unit (CPU). The processor executes the program, and hence the program functions as the support control device 24.

Alternatively, the support control device 24 may use an integrated circuit functioning as the support control device 24.

Also, the robot 2 includes a handle load detector 27 that detects a handle load applied to the handle 23. The handle load detector 27 detects a load applied to the handle 23 by the user when the user grips the handle 23.

For example, when the user sitting on a seat 31 grips the handle 23 and stands up, the user applies a load (a handle load) to the handle 23. The handle load detector 27 detects the orientation and magnitude of the handle load applied by the user to the handle 23.

Alternatively, the handle load detector 27 may divide the handle load applied by the user to the handle 23 into, for example, a handle load in a vertical direction and a handle load in a horizontal direction with respect to the floor, and may detect the handle load in the vertical direction.

For example, a force sensor may be used for such a handle load detector 27. The handle load detected by the handle load detector 27 is input to the support control device 24 and is used when the support control information is created.

Further, the robot 2 includes a communicator 28 that transmits the support control information created by the support control device 24 to the chair 3 through the communication network.

Configuration of Automatic Elevating Chair

As shown in FIGS. 1 and 3, the chair 3 includes the seat 31 on which the user sits, a frame 32 that supports the seat 31 so that the seat 31 can elevate, a seat moving device 33 that moves the seat 31 so that the seat 31 is inclined to the front, and a seat control device 34 that controls the movement of the seat 31 by the seat moving device 33.

In this specification, the front is a direction at the front surface side of the user when the user sits on the chair 3, or a direction (forward) toward the front of the chair 3. The rear is a direction at the rear surface side of the user, or a direction (rearward) toward the rear of the chair 3.

The left-right direction is the left-right direction of the chair 3, or the left-right direction based on the direction at the front surface side of the user. For example, a direction orthogonal to the paper surface of FIG. 1 is the left-right direction.

The seat 31 is supported by the frame 32. To be specific, a front end portion of the seat 31 is supported by the frame 32 rotatably with a rotating shaft (not shown). A rear end portion of the seat 31 is supported by the frame 32 through, for example, a hydraulic elevating actuator 35 as a mechanism that mechanically expands and contracts in the up-down direction. The elevating actuator 35 expands and contracts by hydraulic pressure, and hence the seat 31 moves. To be specific, referring to FIG. 1, for example, when the elevating actuator 35 expands, the seat 31 rotates clockwise around the rotation axis. Also, referring to FIG. 1, for example, when the elevating actuator 35 contracts, the seat 31 rotates counterclockwise around the rotation axis. Since the elevating actuator 35 expands and contracts in this way, the seat can be moved so that an angle θ of the seat 31 with respect to the floor (or the frame 32) is displaced.

In the first embodiment, the seat moving device 33 includes the elevating actuator 35. By expanding and contracting the elevating actuator 35, the seat 31 can be moved to be inclined to the front. In this specification, the angle θ of the seat 31 with respect to the floor is expressed as an angular displacement on the basis of a posture of the seat when the user sits on the seat (for example, a posture in a substantially horizontal state).

The posture of the seat being in the substantially horizontal state represents a state in which the seat 31 and the floor are parallel or substantially parallel to each other. In this state, the frame 32 and the floor are parallel or substantially parallel to each other. Accordingly, when the user is in the sitting posture, the angle between the seat 31 and the frame is 0 degrees or substantially 0 degrees.

Also, instead of the hydraulic elevating actuator 35, the movement of the seat 31 may use any of various driving devices as the elevating actuator 35, for example, an electric motor as the elevating actuator 35.

Also, the seat 31 is provided with a seat load detector 36 that detects a seat load corresponding to a load applied to the seat 31 by the user. The seat load detector 36 detects a load (for example, a force in the vertical direction with respect to the floor) applied to the seat 31 by the sitting user, as the seat load. For example, a pressure sensor may be used for such a seat load detector 36. The seat load detector 36 may include a plurality of seat load detectors 36 in the seat 31 so as to more accurately detect seat loads at a plurality of positions. The seat load detected by the seat load detector 36 is input to the seat control device 34.

Also, the seat 31 is provided with a seat angle detector 37 that detects the angle θ (also referred to as seat angle θ) of the seat 31. An inclination sensor or the like may be used for the seat angle detector 37. The angle θ of the seat 31 detected by the seat angle detector 37 is input to the seat control device 34.

For example, a communicator 38 receives and transmits information through the communication network.

For example, the communicator 38 receives the support control information transmitted from the robot 2. The support control information received by the communicator 38 is input to, for example, the seat control device 34.

The seat control device 34 controls the movement of the seat 31 by the seat moving device 33 (that is, the elevating actuator 35) on the basis of the input support control information. The support control information includes information relating to the movement speed of the seat 31.

The seat control device 34 calculates a control value corresponding to the movement speed included in the support control information, and outputs the calculated control value to the seat moving device 33.

When the seat moving device 33 receives the control value, the seat moving device 33 moves the seat 31 at a movement speed corresponding to the control value. Accordingly, the seat 31 is moved (inclined) at the movement speed included in the support control information received from the robot 2.

The movement speed of the seat 31 is, for example, a movement amount of the seat 31 per unit time. In this embodiment, the seat 31 rotates around the rotation axis. The movement speed of the seat 31 is an amount by which the seat 31 is inclined per unit time by the seat moving device 33. Namely, the movement speed of the seat 31 is a speed by which the seat 31 is inclined by the seat moving device 33.

The amount by which the seat 31 is inclined per unit time by the seat moving device 33 also represents a displacement amount per unit time of the angle θ of the seat 31, an angular speed of the seat 31, a rotational speed of the seat 31, or a speed of the seat angle θ.

Also, the chair 3 is provided with a communicator 38 that transmits seat load information corresponding to information including the seat load detected by the chair 3, and posture information corresponding to information including the seat angle θ, to the robot 2 through the communication network.

Control Configuration of Stand-Up Support System

Figure 4:
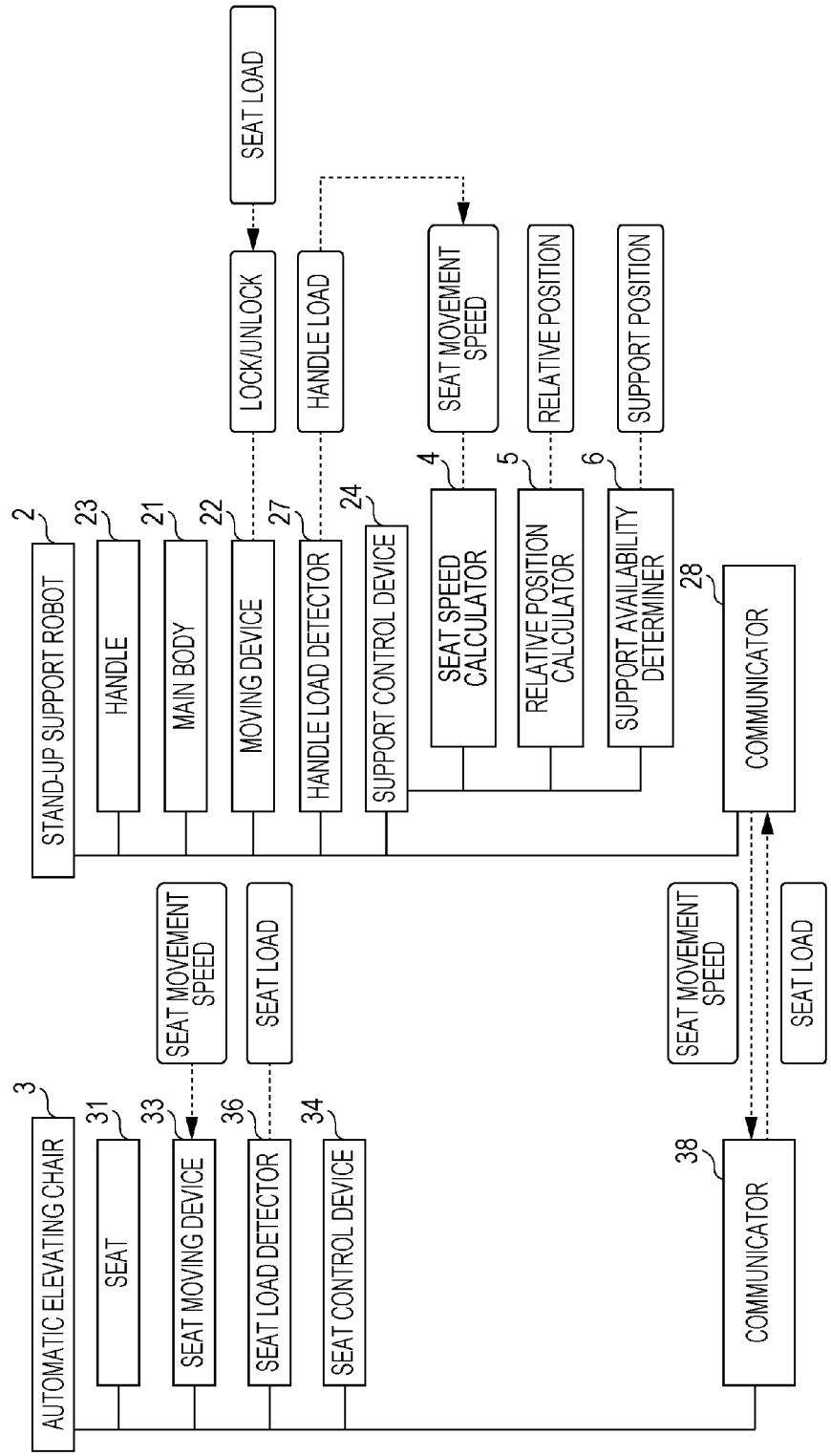
FIG. 4 is a control block diagram of a stand-up support system according to the first embodiment.

Next, a control configuration for controlling the support operation that supports standing up of the user in the stand-up support system 1 having the above-described configuration is described. FIG. 4 shows a control block diagram showing major control configurations in the stand-up support system 1. FIG. 4 also shows the relationship between respective control configurations and information to be used.

As shown in FIG. 4, the support control device 24 included in the robot 2 includes a seat speed calculator 4, a relative position calculator 5, and a support availability determiner 6. The support control device 24 is, for example, a computer, and includes a central processing unit (not shown) and a memory (not shown). The memory previously stores, for example, programs that function as the seat speed calculator 4, the relative position calculator 5, and the support availability determiner 6. For example, the central processing unit of the support control device 24 executes the programs corresponding to the seat speed calculator 4, the relative position calculator 5, and the support availability determiner 6, and executes information processing (described later).

Alternatively, the support control device 24 may use, for example, an integrated circuit that functions as the seat speed calculator 4, the relative position calculator 5, and the support availability determiner 6.

The seat speed calculator 4 calculates a movement amount per unit time of the seat 31 (a speed of the seat 31) in the chair 3 on the basis of the handle load input to the support control device 24. An example is described in which a displacement amount of the angle θ per unit time of the seat 31 (an angular speed of the seat 31) is calculated as the movement amount per unit time of the seat 31. In the following description, the description is given while the displacement amount of the angle θ per unit time of the seat 31 is referred to as speed of the seat angle θ.

The seat speed calculator 4 calculates, for example, the speed of the seat angle θ to be proportional to the detected handle load. That is, the speed of the seat angle θ is calculated so that the speed of the seat angle θ increases as the handle load increases.

The calculation of the speed of the seat angle θ by the seat speed calculator 4 may be any calculation form as long as the calculation uses a previously set algorithm and is based on the handle load. The case is not limited to being proportional to the handle load.

The relative position calculator 5 has a function of calculating a relative position of the robot 2 with respect to the chair 3. For example, the position of the chair 3 and the position of the robot 2 are estimated on the basis of information acquired by an image sensor (not shown), and the relative position of the robot 2 with respect to the chair 3 may be calculated. Alternatively, a movement path of the robot 2 may be stored, and the relative position may be calculated on the basis of the stored information.

The support availability determiner 6 determines whether the relative position calculated by the relative position calculator 5 is located at a support position corresponding to a previously set position or not. If the support availability determiner 6 determines that the relative position is located at the support position, the support availability determiner 6 has a function of determining that stand-up support is available. Then, if the support availability determiner 6 determines that the stand-up support is available, the support availability determiner 6 also has a function of causing the communicator 28 to transmit the speed of the angle θ of the seat 31 calculated by the seat speed calculator 4, to the chair 3.

In this case, the support position is, for example, the position of the robot 2 as shown in FIG. 1, the position of the robot 2 when the robot 2 approaches the user sitting on the chair 3, and the position at which the user can easily grip the handle 23 of the robot 2 by stretching the arm. Also, the support position is not limited to a specific single position, and may be set to have a predetermined range.

Further, the support availability determiner 6 has a function of receiving and acquiring the seat load information including the seat load detected by the chair 3, from the chair 3 through the communicators 28 and 38 if the support availability determiner 6 determines that the stand-up support is available.

The support control device 24 has a function of controlling lock/unlock for the movement by the moving device 22 on the basis of the seat load included in the seat load information received from the chair 3. To be specific, the support control device 24 has a function of locking the movement by the moving device 22 (for example, fixing the wheels 25) if it is determined that the seat load included in the seat load information exceeds a set seat load corresponding to a previously set load, and unlocking the movement by the moving device 22 if the seat load information becomes equal to or smaller than the set seat load.

The support control device 24 outputs the calculated movement speed of the seat 31 to the communicator 28 by adding the movement speed to the support control information. Then, the communicator 28 transmits the support control information to the chair 3 through the network. The communicator 38 of the chair 3 receives the support control information transmitted from the robot 2. The communicator 38 outputs the received support control information to the seat control device 34.

The seat control device 34 of the chair 3 controls the movement of the seat 31 by the seat moving device 33 (that is, the elevating actuator 35) on the basis of the movement speed of the seat 31 included in the support control information input through the communicator 28 of the robot 2 and the communicator 38 of the chair 3.

In this embodiment, the movement speed of the seat 31 included in the support control information is an angular speed of the seat 31. The seat moving device 33 displaces the angle θ of the seat 31 around the rotation axis. The seat control device 34 controls the seat moving device 33 so that the seat 31 rotates at the angular speed of the seat 31 included in the support control information.

Also, the seat control device 34 outputs the seat load information including the seat load detected by the seat load detector 36, and the posture information including the angle θ of the seat 31 detected by the seat angle detector 37 to the communicator 38 while controlling the seat moving device 33 on the basis of the support control information.

The communicator 38 transmits the seat load information and the posture information to the robot 2.

The communicator 28 of the robot 2 outputs the seat load information and the posture information transmitted from the chair 3 to the support control device 24.

Accordingly, the seat load information including the seat load detected by the chair 3 and the posture information including the angle θ of the seat 31 are transmitted from the chair 3 to the robot 2, and are input to the support control device 24 through the communicator 28 of the robot 2. That is, while the seat moving device 33 is controlled on the basis of the support control information, the seat load information and the posture information are fed back from the chair 3 to the support control device 24.

The support control device 24 recognizes the state of the angle θ of the seat 31 on the basis of the received posture information.

Stand-Up Support by Stand-Up Support System

Next, major processes of supporting the stand-up motion of the user sitting on the chair 3 by the stand-up support system 1 according to the first embodiment is described with reference to a flowchart shown in FIG. 5. Also, in the flowchart in FIG. 5, the process in the robot 2 and the process in the chair 3 are shown in parallel, and transmission and reception of information between the robot 2 and the chair 3 are also shown.

Figure 5:
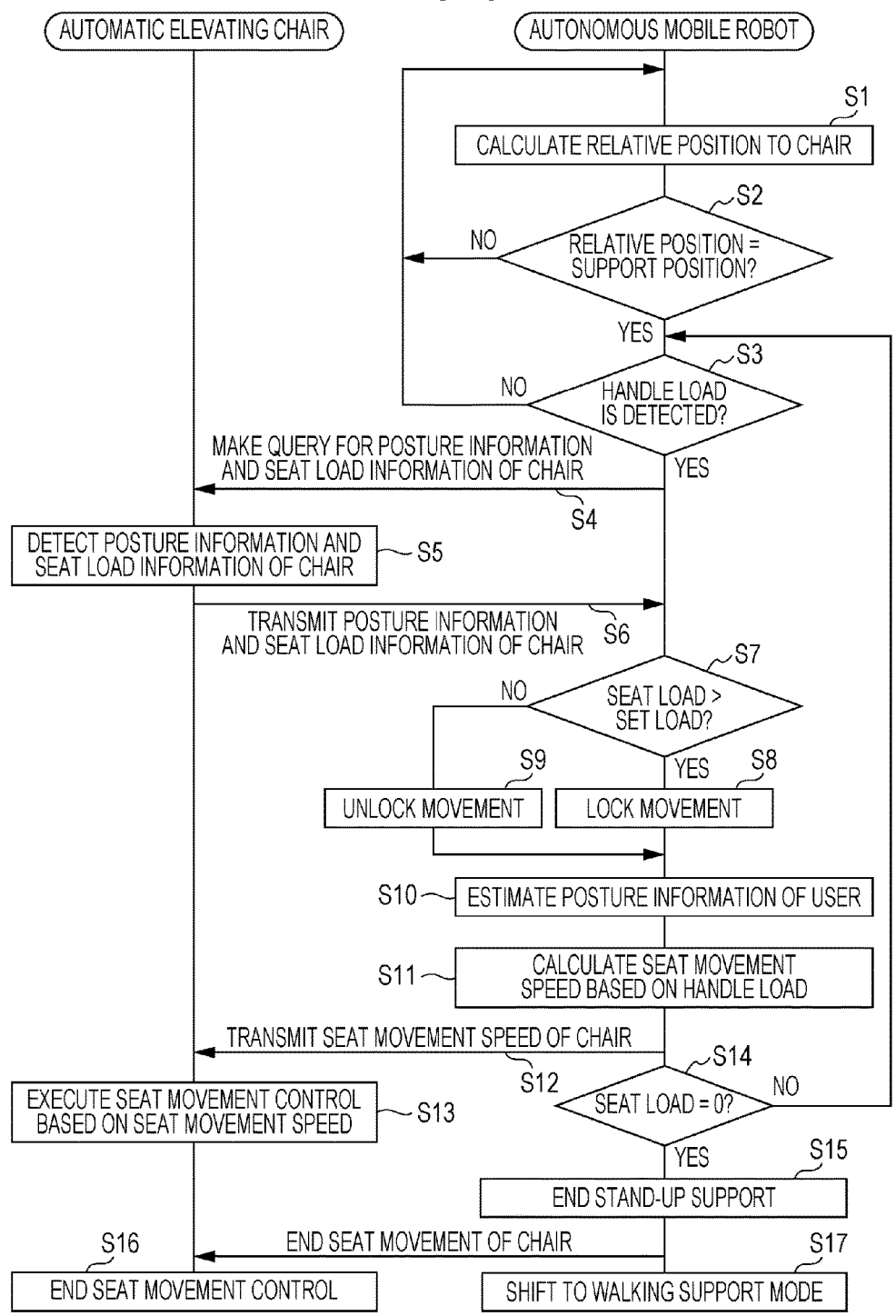
FIG. 5 is a flowchart showing a process of supporting a stand-up motion according to the first embodiment.

First, in step S1 in FIG. 5, the relative position calculator 5 in the support control device 24 of the robot 2 calculates the relative position of the robot 2 with respect to the chair 3. The relative position may be calculated on the basis of information acquired by an image sensor (not shown), or on the basis of information on a movement path of the robot 2. Also, the detection operation for the relative position by the relative position calculator 5 may be started in response to an instruction (an instruction by a remote operation with a remote controller or the like, or an instruction by a voice)

from the user as a trigger, or the detection operation may be periodically started with a predetermined time interval.

Then, the support availability determiner 6 in the support control device 24 of the robot 2 determines whether the relative position of the robot 2 with respect to the chair 3 calculated by the relative position calculator 5 is located at a support position corresponding to a previously set position or not (step S2). If it is determined that the relative position is not located at the support position, the process returns to step S1 and the processing from step S1 to step S2 is repetitively executed.

In step S2, if the support availability determiner 6 determines that the relative position is located at the support position, the support availability determiner 6 determines that the support for the stand-up motion of the user is available. In this case, the handle load detector 27 of the robot 2 detects the handle load (step S3). If the user sitting on the chair 3 grips the handle 23 of the robot 2, the handle load detector 27 detects the handle load. In step S3, if the handle load is not detected, the user does not grip the handle 23 or the user does not apply a load to the handle 23 although the user grips the handle 23. It is assumed that the stand-up motion is not started, and the processing from step S1 to step S3 is repetitively executed. When the handle load is detected in step S3, the detection of the handle load may be determined if a handle load being a previously set load or larger is detected. That is, in step S3, if a handle load being smaller than the previously set load is detected, the state may be that the user grips the handle 23 but does not apply a load to the handle 23. It is assumed that the stand-up motion is not started. Then, the process may return to step S1.

If the handle load is detected in step S3, the support control device 24 of the robot 2 makes a query (an information acquisition request) for the posture information and the seat load information of the chair 3, to the chair 3 through the communicator 28 (step S4).

The chair 3 receives the information acquisition request transmitted from the robot 2. To be specific, the communicator 38 receives the information acquisition request transmitted from the robot 2, and outputs the received information acquisition request to the seat control device 34.

The seat control device 34 of the chair 3 having the information acquisition request received through the communicator 38 causes the seat angle detector 37 to execute the detection operation for the seat angle, and causes the seat load detector 36 to execute the detection operation for the seat load (step S5). Information including the detected angle θ and information including the detected seat load of the seat 31 are transmitted as the posture information of the chair 3 and the seat load information of the chair 3 by the seat control device 34 through the communicator 38 to the robot 2 (step S6).

The robot 2 receives the posture information and the seat load information transmitted from the chair 3. To be specific, the communicator 28 receives the posture information and the seat load information transmitted from the chair 3, and outputs the received posture information and seat load information to the support control device 24. Accordingly, the support control device 24 can acquire the posture information and seat load information received by the communicator 28 from the chair 3.

The support control device 24 of the robot 2 determines whether the seat load included in the seat load information received from the chair 3 exceeds a previously set load (referred to as set load) or not (step S7). If it is determined that the seat load exceeds the set load, it is assumed that the user is in a state in which the user sits on the chair 3 or the user is in the middle of the stand-up motion. At this time, the support control device 24 locks the wheels 25 of the moving device 22 and hence restricts the forward movement of the robot 2 (step S8). Accordingly, a load applied to the handle 23 by the user in a state in which the user does not complete the stand-up motion can be stably received by the robot 2 in which the movement is restricted.

In contrast, in step S7, if it is determined that the seat load is equal to or smaller than the set load, it is assumed that the user substantially completes the stand-up motion. The wheels 25 of the moving device 22 are unlocked (step S9). Accordingly, the robot 2 is a movable forward, and this state is continued to support for a subsequent walking-start motion of the user.

Then, the support control device 24 of the robot 2 estimates posture information of the user on the basis of the angle θ of the seat 31 included in the posture information or/and the seat load included in the seat load information received from the chair 3 (step S10). For example, the support control device 24 estimates posture information of the user in stand-up motion on the basis of the information on the angle θ of the seat 31.

For example, the support control device 24 assumes that the user is in a state closer to an initial phase in stand-up motion as the angle θ of the seat 31 is smaller (or as the angle θ of the seat 31 is in a range from 0 to a first predetermined angle).

Also, for example, the support control device 24 assumes that the user is in a state closer to a terminal phase in stand-up motion as the seat angle is larger (or the angle θ of the seat 31 is larger than a second predetermined angle).

The first predetermined angle is previously set as a value that can be estimated by the support control device 24 as a posture close to the above-described initial phase.

The second predetermined angle is previously set as a value that can be estimated by the support control device 24 as a posture close to the above-described terminal phase.

Alternatively, the posture information of the user may be estimated by the support control device 24 by using not only the information on the angle θ of the seat 31 but also the seat load information. As the stand-up motion progresses to the terminal, the seat load tends to decrease. Hence, the posture information of the user can be estimated even on the basis of the seat load information.

Then, the seat speed calculator 4 in the support control device 24 of the robot 2 calculates the speed of the seat angle θ in seat movement of the chair 3 on the basis of the handle load, by using a previously set algorithm (step S11). Alternatively, the seat speed calculator 4 may calculate the speed of the seat angle θ on the basis of the handle load, and the seat load included in the seat load information, by using a previously set algorithm.

The speed of the seat angle θ is a control value for the angular speed of the seat 31 in a moving (rotating) operation (an expanding and contracting operation of the elevating actuator 35) of the seat 31 in the chair 3. The stand-up support system 1 according to the first embodiment executes the control that changes the control value of the angular speed in seat movement, in accordance with the magnitude of the handle load. The speed of the seat angle (the control value of the speed) in movement of the seat 31 may be the angular speed value, or may be a control value of the elevating actuator of the chair 3 (an expansion speed or the like). The speed of the seat angle θ in seat movement of the chair 3 calculated by the seat speed calculator 4 is added to, for example, the support control information by the support control device 24. The support control information is transmitted by the support control device 24 through the communicator 28 to the chair 3 (step S12).

The seat control device 34 of the chair 3 controls the movement of the seat 31 by the seat moving device 33, by using the speed of the seat angle θ included in the support control information received from the robot 2 through the communicator 38 (step S13). The seat control device 34 controls the operation of the elevating actuator 35, for example, by calculating the control value of the elevating actuator 35 corresponding to the speed of the seat angle θ. Alternatively, as the speed of the seat angle θ, the control value of the elevating actuator 35 itself may be received from the robot 2, and the operation of the elevating actuator 35 may be controlled by using the control value. Accordingly, the seat 31 of the chair 3 moves to be inclined forward, a force of pushing up the hip of the user obliquely forward and upward acts on the user, and hence the stand-up motion of the user can be supported.

Then, the support control device 24 of the robot 2 determines whether the seat load included in the seat load information received from the chair 3 in step S6 is 0 (zero) or not (step S14). If the seat load is not zero, it is determined that the stand-up motion of the user is not ended. The process returns to step S3, and the handle load detector 27 detects the handle load again. By executing step S12 and step S13, the seat angle θ of the chair 3 is changed. Accordingly, the posture information of the user is changed. Accordingly, the handle load to be detected by executing step S3 again is also changed. Then, the processing from step S4 to step S13 is executed, and the movement of the seat 31 of the chair 3 is controlled by using the speed of the seat angle θ calculated on the basis of the newly detected handle load. The processing from step S3 to step S14 is repetitively executed until it is determined that the seat load is zero in step S14.

Also, in step S14, if the support control device 24 of the robot 2 determines that the seat load is zero, the support control device 24 assumes that the user is completely separated from the chair 3, and the stand-up support processing is ended (step S15). The support control device 24 of the robot 2 transmits information which causes the control on the movement of the seat 31 to be ended, to the chair 3 through the communicator 28. The chair 3 receives the information which causes the control on the movement of the seat 31 to be ended, from the robot. To be specific, the communicator 38 receives the information which causes the control on the movement of the seat 31 to be ended, from the robot, and outputs the received information to the seat control device 34. When the seat control device 34 receives the information which causes the control on the movement of the seat 31 to be ended, the seat control device 34 ends the control on the movement of the seat 31 of the chair 3 (step S16).

In this case, the seat control device 34 may control the elevating actuator 35 to rotate the seat 31 counterclockwise so that the angle of the seat 31 becomes 0 degrees, and then may end the control on the movement of the seat 31.

Then, the robot 2 with the handle 23 gripped by the user is switched from a stand-up support mode to a walking support mode (step S17), and support for a walking motion of the user is started.

Relationship Among Handle Load, Seat Movement Speed, and Seat Load

Next, the relationship among the handle load, the seat movement speed, and the seat load in stand-up support for the user is described with reference to graphs in FIG. 6. The relationship among the loads and the speed shown in FIG. 6 is merely an example, and the present disclosure is not limited by the relationship.

Figure 6:
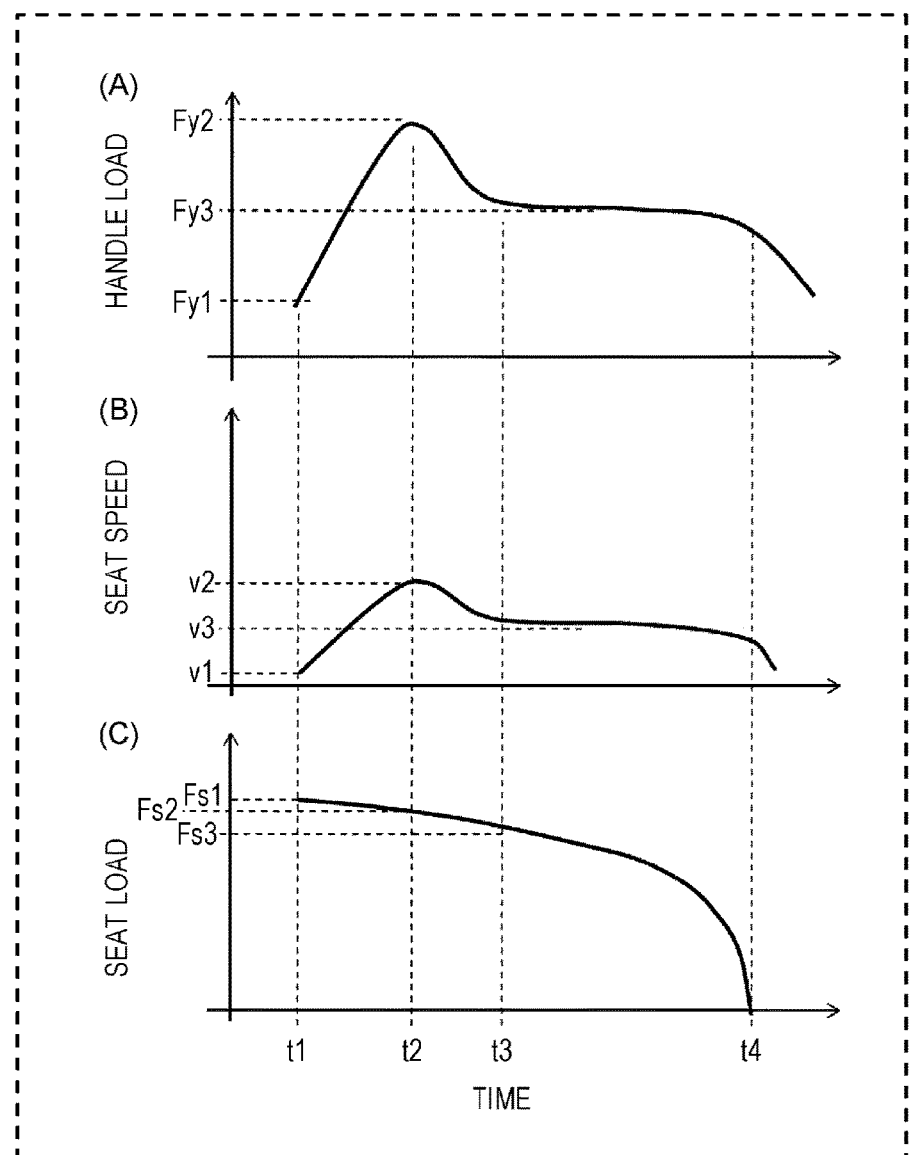
FIG. 6 illustrates graphs showing the relationship among a handle load, a seat movement speed, and a seat load in stand-up support for a user according to the first embodiment.

In the graphs shown in FIG. 6, FIG. 6(A) shows the relationship between a handle load Fy and a time t, FIG. 6(B) shows the relationship between a speed (a seat speed) v of the seat 31 and a time t, and FIG. 6(C) shows the relationship between a seat load Fs and a time t.

The handle load Fy is a component in a direction perpendicular to the floor (y direction) included in the handle load acting on the handle 23 of the robot 2.

The seat load Fs is a seat load acting on the seat 31.

First, when a handle load Fy1 is detected at a time t1, a seat speed v1 is calculated by using a predetermined algorithm on the basis of the handle load Fy1, and the movement control on the seat 31 is started so that the seat speed becomes v1.

The handle load Fy increases with time, and the seat speed v is set to be proportional to the handle load Fy. When the stand-up motion is started, the load based on the weight of the user is shifted from the seat 31 to the legs of the user and the handle 23. Accordingly, the seat load Fs gradually decreases.

At a time t2, the handle load Fy becomes a handle load Fy2 being the maximum value, and the seat speed v becomes a seat speed v2 being the maximum value accordingly. At this time, the seat load Fs decreases to Fs2. Then, as the handle load Fy decreases, the seat speed v decreases. At a time t3, the decrease tendency of the handle load Fy becomes gradual, and the handle load Fy slightly decreases while holding a load of about Fy3. The seat speed v is also set at a value v3 corresponding to the handle load Fy3. The seat load Fs also gradually decreases to Fs3.

Then, at a time t4, the seat load Fs rapidly decreases, and the load of zero is detected. The user is separated from the seat 31 of the chair 3, and the stand-up motion is completed. At the time t4 and later, the handle load Fy and the seat speed v largely decrease. Regarding the handle load Fy, a certain load applied to the handle 23 by the standing user is detected.

As described above, in the initial phase of the stand-up motion from the time t1 to the time t2, the movement control on the seat 31 is executed so that the seat speed increases in proportion to the increase in the handle load applied to the handle 23 by the user. Accordingly, in the initial phase of the stand-up motion, the user can be pushed out obliquely forward and upward by the seat 31, and hence the stand-up motion of the user can be smoothly supported.

Also, from the time t2 to the time t4, since the load of the user is gradually shifted to the legs of the user, the handle load decreases, and the seat speed decreases accordingly. Hence, the user who approaches the stand-up posture can be brought into the completion of the stand-up motion while the stand-up motion is gently supported without adding a rapid push-out force.

With the stand-up support system 1 according to the first embodiment, the seat movement is controlled by calculating the speed of the seat 31 in seat movement on the basis of the magnitude of the handle load detected when the user grips the handle 23 of the robot 2. Such a handle load changes in accordance with the posture (the state) of the user in the middle of the stand-up motion. Accordingly, in standing up from the chair serving as the starting point of living action of the user, a physical burden on the user is decreased, and the user can perform smooth posture transition.

In this embodiment, the posture information and seat load information transmitted from the chair 3 are received by the communicator 28 of the robot 2, and the communicator 28 outputs the received posture information and seat load information to the support control device 24. However, it is not limited thereto. For example, if the robot 2 includes a register (not shown), the received posture information and seat load information may be stored in the register, and the support control device 24 may read out the posture information and seat load information stored in the register.

The support control device 24 may read out the posture information and seat load information stored in the register every predetermined period. Alternatively, the support control device 24 may read out the posture information and seat load information stored in the register in response to the reception of a notification from the communicator 28.

That is, any configuration may be employed as long as the support control device 24 can acquire the posture information and seat load information received by the communicator 28.

In this embodiment, when the query for the posture information and the seat load information of the chair 3 is received from the robot 2, the seat control device 34 of the chair 3 causes the seat angle detector 37 to detect the angle θ of the seat 31, causes the seat load detector 36 to detect the seat load, and causes the communicator 38 to transmit the posture information including the angle θ of the seat 31 and the seat load information including the seat load to be transmitted to the robot 2. However, it is not limited thereto. For example, the seat angle detector 37 may detect the angle θ of the seat 31 every predetermined period, and may temporarily store the posture information including the detected angle θ of the seat 31 in the register (not shown).

Alternatively, the seat load detector 36 may detect the seat load every predetermined period, and the seat load information including the detected seat load may be temporarily stored in the register.

Then, if the query for the posture information and seat load information of the chair 3 is received from the robot 2, the seat control device 34 or the communicator 38 of the chair 3 reads out the posture information and the seat load information from the register, and transmits the posture information and the seat load information through the communicator 38.

That is, when the query for the posture information and the seat load information of the chair 3 is received from the robot 2, any configuration may be employed as long as the communicator 38 can acquire and transmit the posture information and the seat load information.

In this embodiment, the configuration is exemplarily described, in which the support control information transmitted from the robot 2 is received by the communicator 38 of the chair 3, and the communicator 38 outputs the received support control information to the seat control device 34. However, it is not limited thereto. For example, if the chair 3 includes a register (not shown), the communicator 38 of the chair 3 may store the received support control information in the register, and the seat control device 34 may read out the support control information stored in the register. The seat control device 34 may read out the support control information stored in the register every predetermined period. Alternatively, the seat control device 34 may read out the support control information stored in the register in response to the reception of a notification from the communicator 38.

That is, any configuration may be employed as long as the seat control device 34 can acquire the support control information received by the communicator 38.

Also, the support control information transmitted from the robot 2 may include a control command for displacing the angle θ of the seat 31 of the chair 3.

Also, in this embodiment, the configuration is exemplarily described, in which the seat 31 rotates around the rotation axis; however, it is not limited thereto. For example, an actuator that moves the seat 31 in a direction parallel to the floor and a direction perpendicular to the floor may be further provided. For example, a mechanism (not shown) that allows the frame 32 supporting the seat 31 to slide in the direction parallel to the floor and the direction perpendicular to the floor may be provided, and the seat moving device 33 may include an actuator that further moves the frame 32 in the direction parallel to the floor and the direction perpendicular to the floor. Then, the chair 3 may include a detector (not shown) that detects the slide amount of the frame 32 by the actuator.

In this case, when the query for the posture information of the chair 3 is received from the robot 2, the seat control device 34 may create posture information including the detected angle θ of the seat 31 and the slide amount of the frame 32 detected by the detector (not shown). Also, the support control device 24 of the robot 2 calculates a slide amount (a slide speed) by which the frame 32 is displaced per unit time in the direction parallel to the floor and the direction perpendicular to the floor, on the basis of the slide amount by which the frame 32 slides and which is included in the received posture information and the handle load applied to the handle 23. The seat control device 34 may create support control information including the speed of the seat angle θ and the slide speed, and may transmit the created support control information to the chair 3.

The communicator 38 of the chair 3 outputs the received support control information to the seat control device 34. The seat control device 34 calculates a control value corresponding to the slide speed included in the received support control information, and controls the movement speed of the frame 32 in accordance with the calculated control value by the above-described actuator.

Second Embodiment

Next, a stand-up support system 51 according to a second embodiment of the present disclosure is described with reference to a control block diagram in FIG. 7. The same reference numerals are applied to configurations common to those of the stand-up support system 1 in the above-described first embodiment, and the descriptions are omitted. Hereinafter, points different from the stand-up support system 1 in the first embodiment are mainly described.

Figure 7:
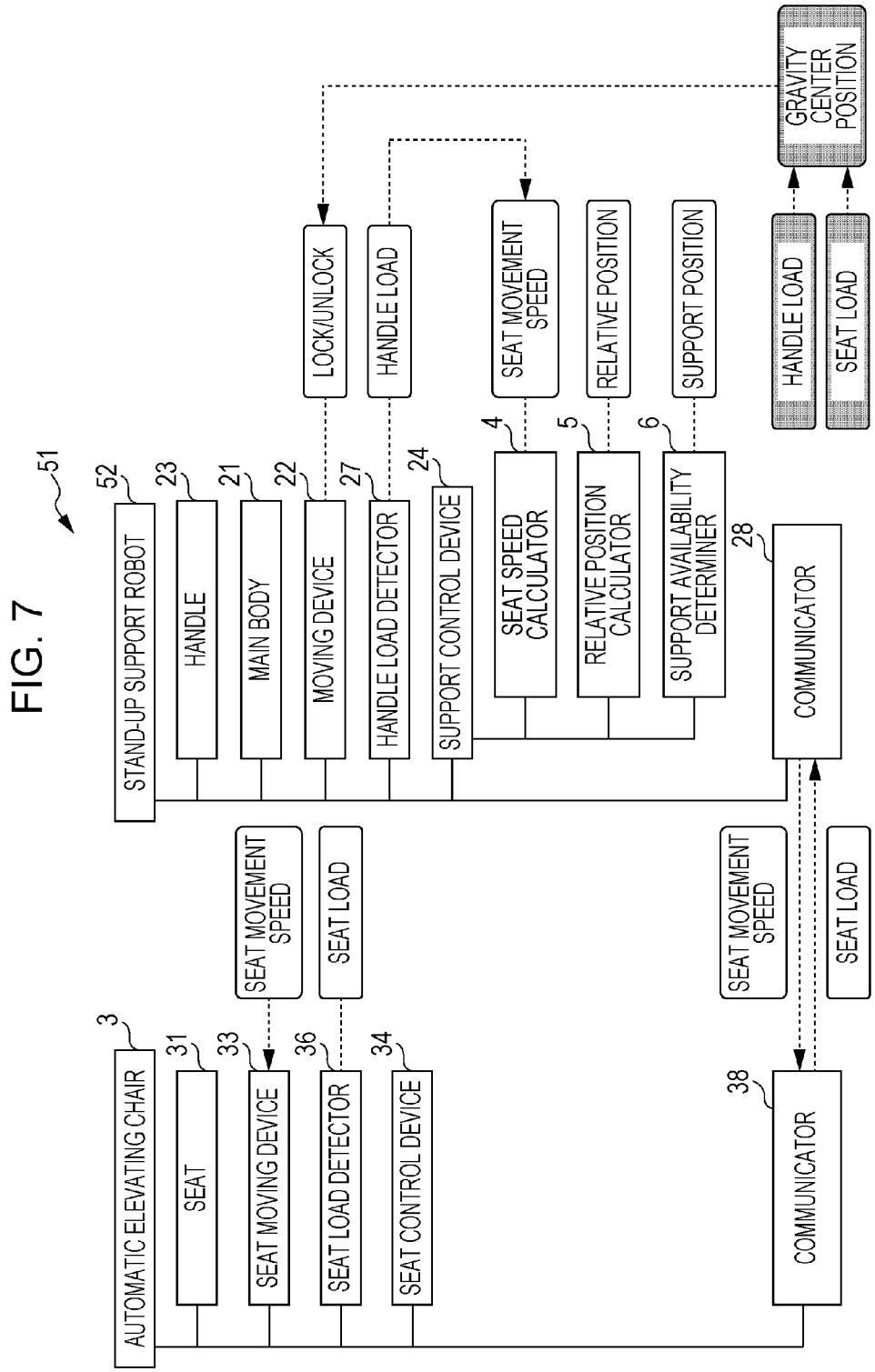
FIG. 7 is a control block diagram of a stand-up support system according to a second embodiment.

As shown in FIG. 7, the stand-up support system 51, corresponding to a living support system, includes a robot 52 corresponding to an autonomous mobile robot, and a chair 3 corresponding to an automatic elevating chair.

A support control device 24 of the robot 52 has a function of calculating a gravity center position of a user on the basis of a handle load detected by a handle load detector 27 and a seat load included in seat load information received from the chair 3. The support control device 24 determines whether the calculated gravity center position of the user satisfies a previously set condition (also referred to as first set condition) or not. If the set condition is satisfied, wheels 25 of a moving device 22 are unlocked. For the set condition, a predetermined distance at the front of the gravity center position of the user sitting on the chair 3 may be set. In this case, the support control device 24 determines that the gravity center position of the user calculated on the basis of the handle load and the seat load satisfies the set condition if the gravity center position reaches the set predetermined distance (or the position at the predetermined distance). The support control device 24 includes a gravity center position calculator (not shown) that calculates the gravity center position of the user. The gravity center position calculator may execute a calculation operation for the above-described gravity center position.

Further, the support control device 24 may control the moving device 22 so that the robot 2 moves away from the chair 3 (that is, forward) in accordance with the gravity center position of the user after the wheels 25 of the moving device 22 are unlocked.

Such control can avoid that the user approaches the robot 2 and hence is brought into an uncomfortable posture in the middle of the stand-up motion of the user. Also, if walking support is provided continuously after stand-up support is ended, a continuous smooth operation from the stand-up support to the walking support can be provided.

Third Embodiment

Next, a stand-up support system 61 according to a third embodiment of the present disclosure is described with reference to a control block diagram in FIG. 8. The same reference numerals are applied to configurations common to those of the stand-up support system 1 in the above-described first embodiment, and the descriptions are omitted. Hereinafter, points different from the stand-up support system 1 in the first embodiment are mainly described.

Figure 8:
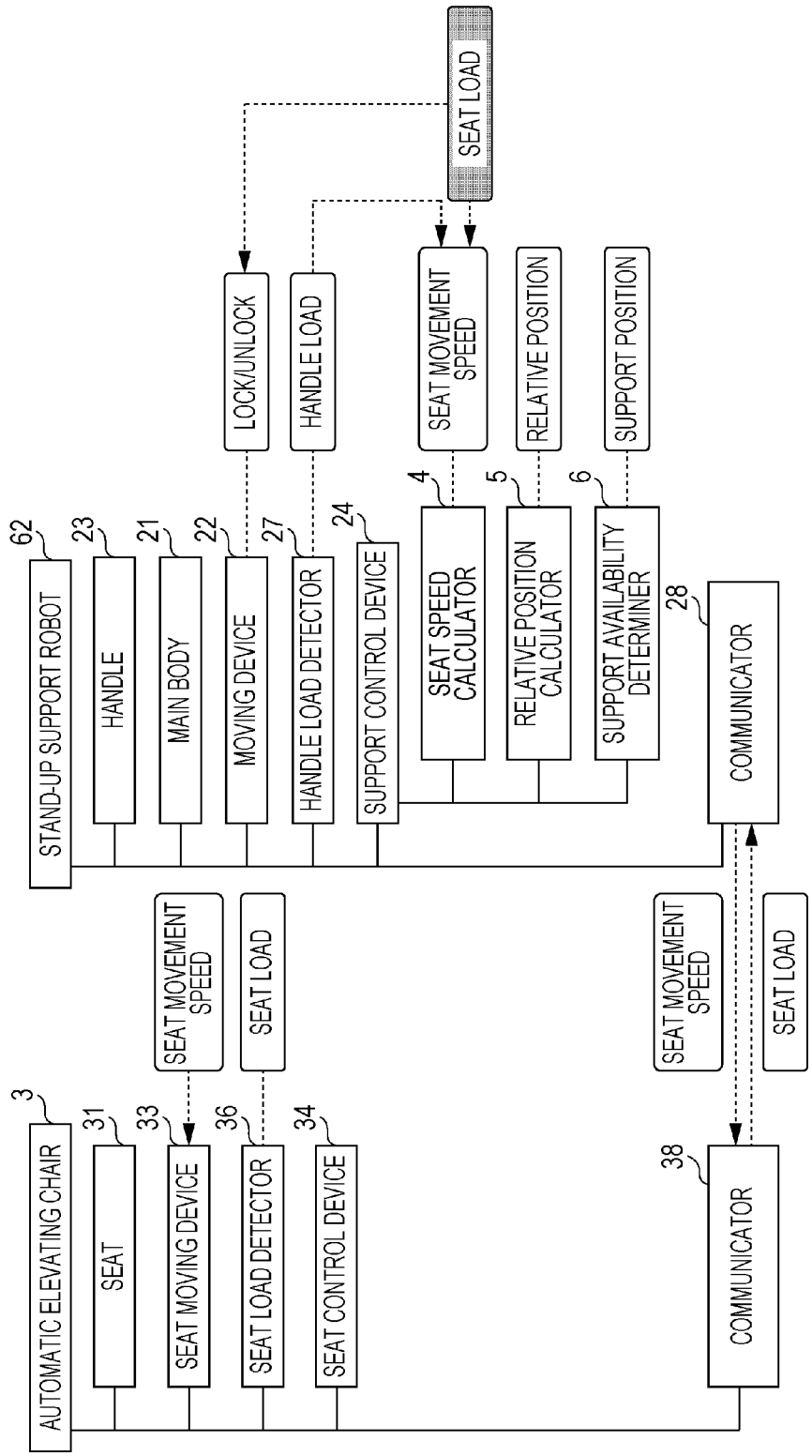
FIG. 8 is a control block diagram of a stand-up support system according to a third embodiment.

As shown in FIG. 8, the stand-up support system 61, corresponding to a living support system, includes a robot 62 corresponding to an autonomous mobile robot, and a chair 3 corresponding to an automatic elevating chair.

A seat speed calculator 4 in a support control device 24 of the robot 62 has a function of calculating a speed in seat movement of the chair 3 by using a previously set algorithm on the basis of a handle load and a seat load. The handle load is information detected by a handle load detector 27. The seat load is information included in seat load information received from the chair 3.

Figure 9:
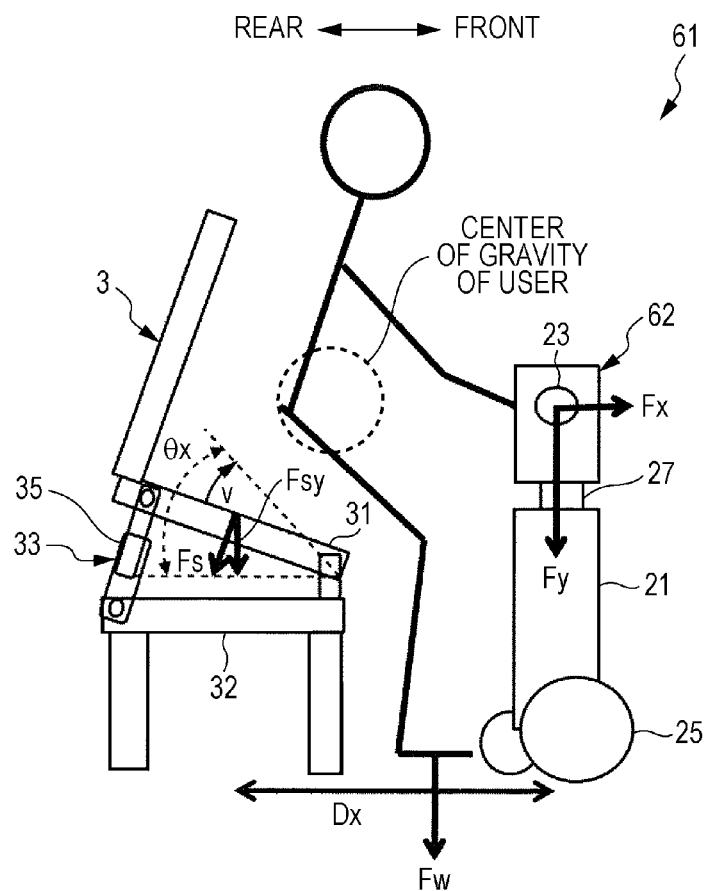
FIG. 9 is a schematic view showing parameters used for controlling a stand-up support operation in the stand-up support system according to the third embodiment.

In this case, FIG. 9 is a schematic view showing parameters used for controlling a stand-up support operation for a user in the stand-up support system 61 according to the third embodiment. The parameters shown in FIG. 9 are merely examples, and the present disclosure is not limited by the examples.

The schematic view in FIG. 9 shows a state in which the user grips a handle 23 of the robot 62, is separated from a seat 31 of the chair 3, and stands up. In the drawing, Fx is a component in a direction parallel to a floor (x direction) included in the handle load acting on the handle 23 of the robot 62. Fy is a component in a direction perpendicular to the floor (y direction) included in the handle load acting on the handle 23 of the robot 62.

Fs is a seat load acting on the seat 31. Fsy is a component in the y direction included in the seat load Fs. Fw is a load acting on the legs of the user.

When the user makes the stand-up motion, the weight of the user is divided into the load Fw acting on the legs of the user, the handle load Fy acting on the handle 23 of the robot 62, and the component Fsy in the y direction of the seat load Fs acting on the seat 31 of the chair 3.

The robot 62 is located at a support position at the front of the chair 3 by a distance Dx. In the stand-up support system 1 according to the third embodiment, the support control device 24 calculates a speed v in seat movement on the basis of the handle load Fy, and the component Fsy in the y direction of the seat load Fs. Then, on the basis of the speed v, expansion of the elevating actuator 35 is controlled, and an angle θx of the seat 31 is controlled.

The speed v of the seat in seat movement can be calculated by using, for example, Expression 1 to Expression 3 as follows:

$$v=(Fy \cdot Kx+Fs \cdot Ky)/K \qquad \text{Expression 1;}$$

$$Kx=Dx/3 \qquad \text{Expression 2; and}$$

$$Ky=\cos \theta x = Fsy \qquad \text{Expression 3.}$$

In this case, a coefficient K is set at, for example, K=60. However, it is desirable to set the coefficient K at a proper value corresponding to the apparatus specification, environment, or user by repeating demonstrative experiments etc. Kx and Ky are correction values to meet the state of a system used for speed calculation.

Also, since Fx is the forward component included in the load acting on the handle 23, and the load component Fx serves as a force of moving the user forward, the component Fx desirably acts by a certain magnitude. However, an excessively large component Fx may affect the stability of the robot 2. Therefore, Fx is desirably limited in a certain range.

Also, if the distance Dx from the chair 3 to the support position increases, the load Fw acting on the legs of the user increases. Consequently, the forward component Fx acting on the handle 23 tends to decrease. Owing to this, if the distance Dx to the support position is large, it is desirable to employ control which increases the forward component Fx acting on the handle 23. Such control may be increasing the speed of the angle θ of the seat 31.

In the stand-up support system 61 according to the third embodiment, the seat speed calculator 4 calculates the speed in seat movement of the chair 3 by using the previously set algorithm on the basis of the handle load and the seat load. Accordingly, the speed v of the seat 31 can be controlled while correctly recognizing the posture and state of the user in stand-up motion with the information on the two loads.

Fourth Embodiment

Next, a stand-up support system 71 according to a fourth embodiment of the present disclosure is described with reference to a control block diagram in FIG. 10. The same reference numerals are applied to configurations common to those of the stand-up support system 1 in the above-described first embodiment, and the descriptions are omitted. Also, the stand-up support system 71 according to the fourth embodiment has control contents common to those in the stand-up support system 51 according to the above-described second embodiment. Therefore, points different from the stand-up support system 51 in the second embodiment are mainly described.

Figure 10:
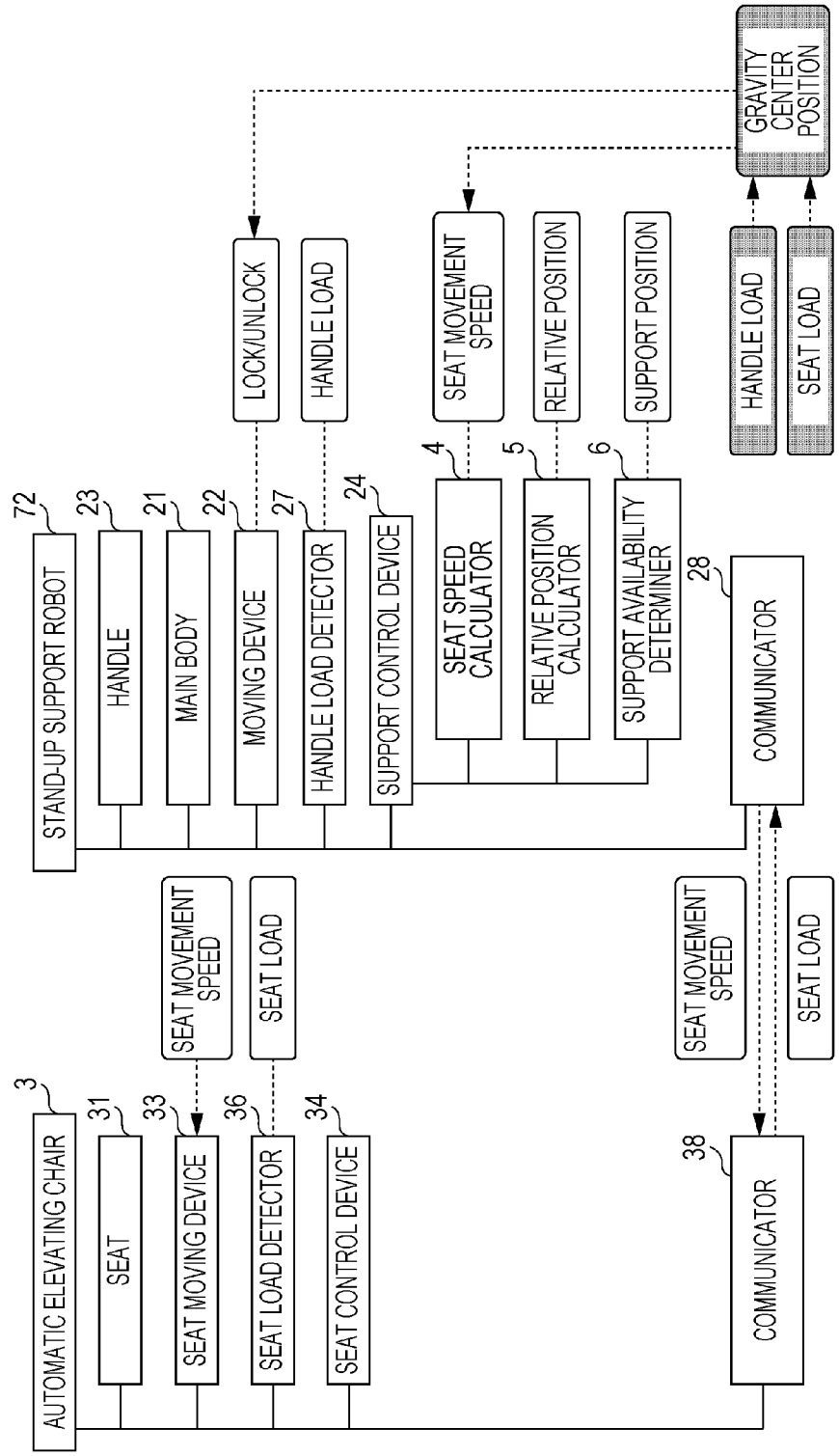
FIG. 10 is a control block diagram of a stand-up support system according to a fourth embodiment.

As shown in FIG. 10, the stand-up support system 71, corresponding to a living support system, includes a robot 72 corresponding to an autonomous mobile robot, and a chair 3 corresponding to an automatic elevating chair.

A support control device 24 of the robot 72 has a function of calculating a gravity center position of a user on the basis of a handle load detected by a handle load detector 27 and a seat load received from the chair 3. The support control device 24 determines whether the calculated gravity center position of the user satisfies a previously set condition or not. If the set condition is satisfied, wheels 25 of a moving device 22 are unlocked.

Also, a seat speed calculator 4 in the support control device 24 has a function of calculating a movement speed by which a seat moving device 33 of the chair 3 moves a seat 31 so that a movement speed at the calculated gravity center position of the user satisfies a previously set condition (also referred to as second set condition). The second set condition may be, for example, a gravity-center-position movement curve. The seat speed calculator 4 calculates the movement speed of the seat 31 of the chair 3 so that the transition of the gravity center position, when the gravity center position of the user is moved at the calculated movement speed, is located on a previously set gravity-center-position movement curve. In the chair 3, movement control on the seat 31 is executed on the basis of the movement speed of the seat 31 received from the robot 72.

With such control, the stand-up motion can be supported while the gravity center position of the user is moved under the predetermined set condition. Accordingly, smooth posture transition can be provided while the burden on the body is decreased.

Fifth Embodiment

Next, a stand-up support system 81 according to a fifth embodiment of the present disclosure is described with reference to a control block diagram in FIG. 11. The same reference numerals are applied to configurations common to those of the stand-up support system 1 in the above-described first embodiment, and the descriptions are omitted. Hereinafter, points different from the stand-up support system 1 in the first embodiment are mainly described.

Figure 11:
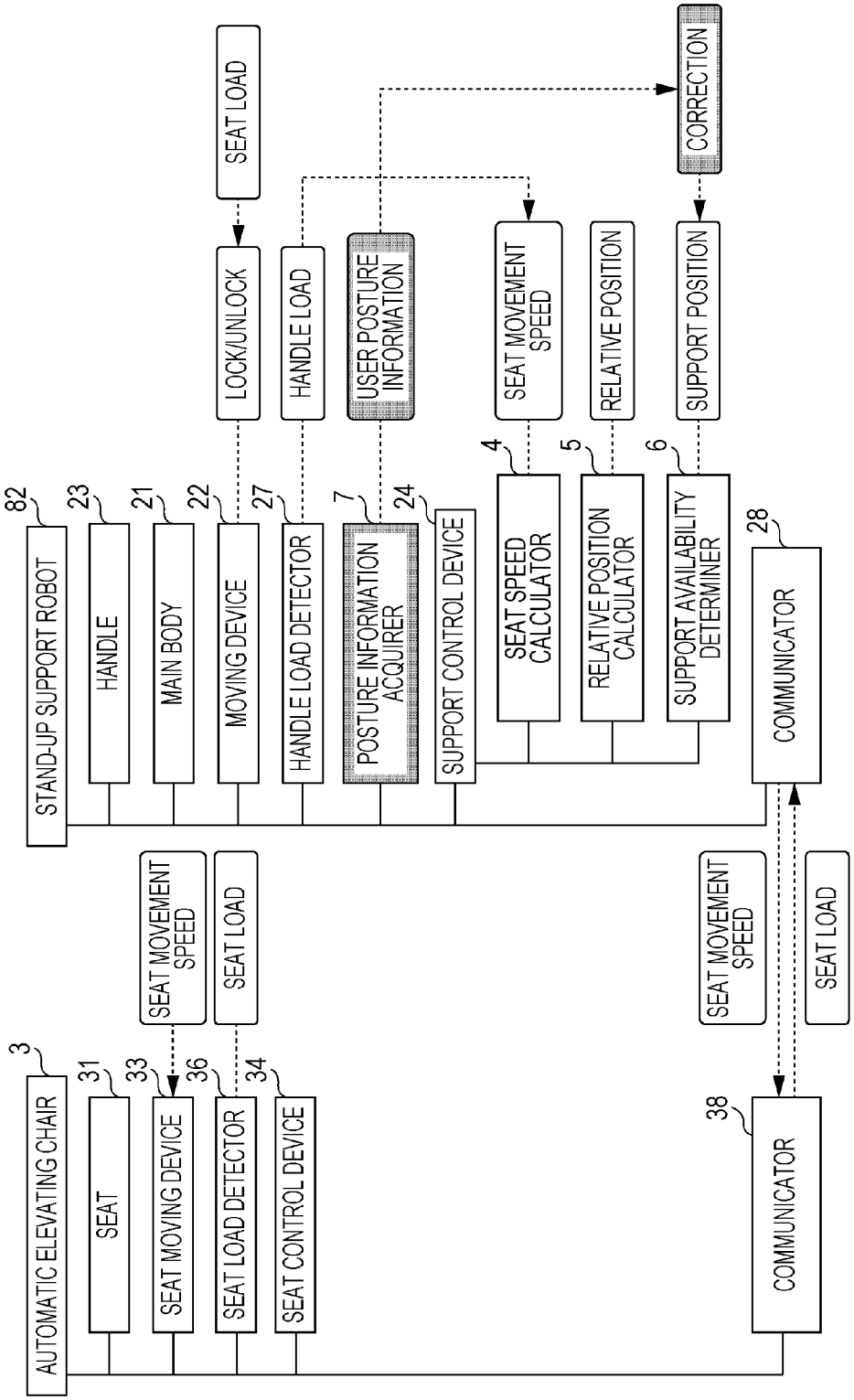
FIG. 11 is a control block diagram of a stand-up support system according to a fifth embodiment.

As shown in FIG. 11, the stand-up support system 81, corresponding to a living support system, includes a robot 82 corresponding to an autonomous mobile robot, and a chair 3 corresponding to an automatic elevating chair.

The robot 82 includes a posture information acquirer 7 that acquires posture information corresponding to information relating to the posture of a user sitting on the chair 3. The posture information acquirer 7 may include, for example, a camera (not shown), take an image of the external posture of the user with the camera, and acquire posture information of the user from the taken image. Alternatively, posture information of the user associated with ID information of the user may be acquired on the basis of the ID information of the user. Such posture information of the user may use, for example, information relating to the position of the legs (for example, the position in the horizontal direction of the legs with respect to the chair 3) of the user sitting on the chair 3. The posture information acquirer 7 inputs the acquired posture information to a support control device 24.

The support control device 24 of the robot 82 corrects a support position on the basis of the posture information of the user input by the posture information acquirer 7, and controls a moving device 22 to move the robot 82 so that the robot 82 is located at the corrected support position.

For example, if the user is sitting on the chair in a posture in which the position of the legs of the user is far from the chair 3, the support position may be corrected to a position farther from the chair 3 than a standard position on the basis of such posture information. Accordingly, smooth posture transition can be provided from the position of the legs of the user as the starting point.

Also, for example, if the user is sitting on the chair in a posture in which the position of the legs of the user is close to the chair 3, the support position may be corrected to a position closer to the chair 3 than the standard position on the basis of such posture information. Accordingly, smooth posture transition can be provided from the position of the legs of the user as the starting point.

Sixth Embodiment

Next, a stand-up support system 91 according to a sixth embodiment of the present disclosure is described with reference to a control block diagram in FIG. 12. The same reference numerals are applied to configurations common to those of the stand-up support system 1 in the above-described first embodiment, and the descriptions are omitted. Hereinafter, points different from the stand-up support system 1 in the first embodiment are mainly described.

Figure 12:
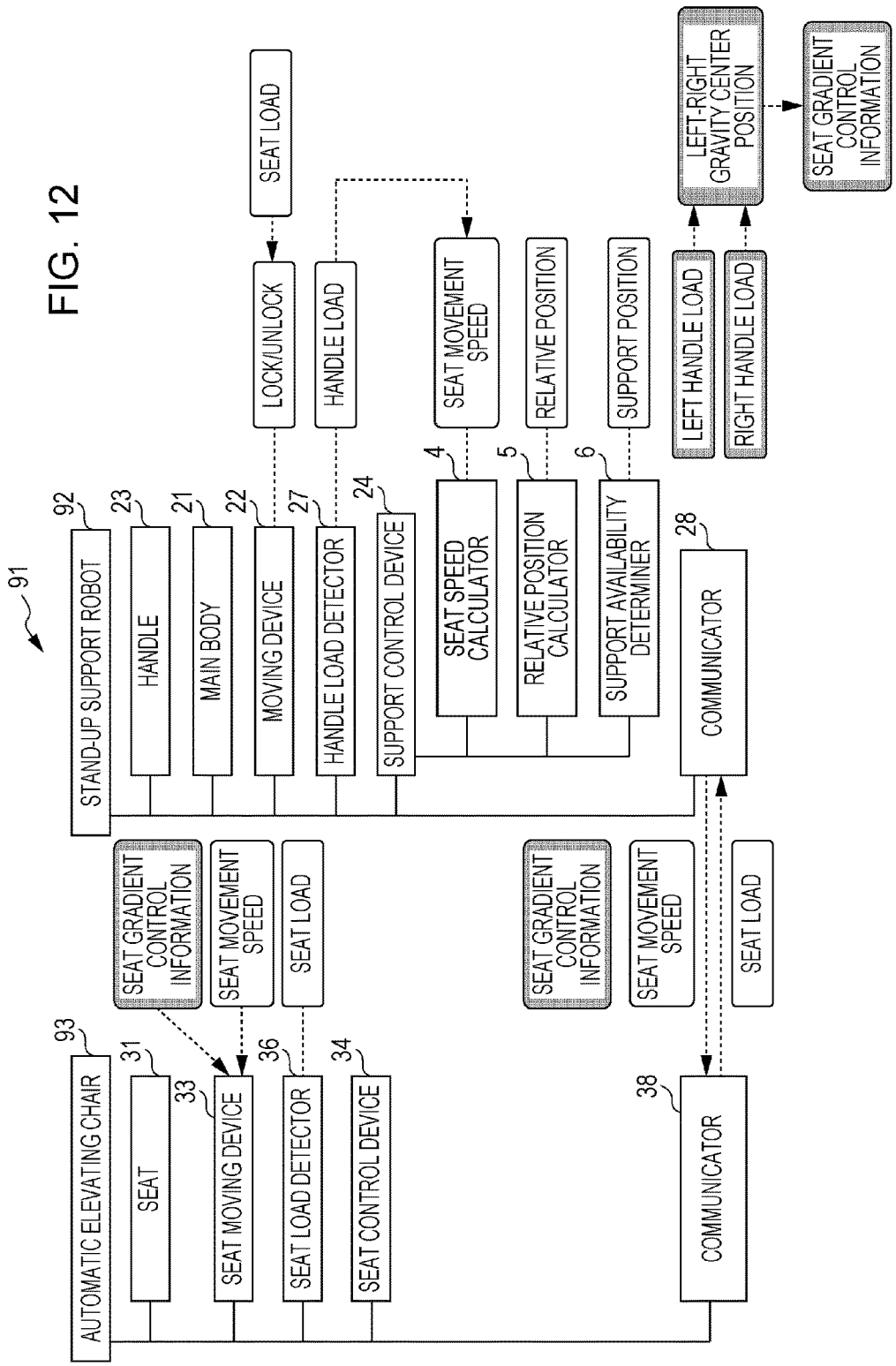
FIG. 12 is a control block diagram of a stand-up support system according to a sixth embodiment.

As shown in FIG. 12, the stand-up support system 91, corresponding to a living support system, includes a robot 92 corresponding to an autonomous mobile robot, and a chair 93 corresponding to an automatic elevating chair.

A handle load detector 27 of the robot 92 has a function of detecting a left handle load which is applied by a user to a left portion with respect to the center of a handle 23, and a right handle load which is applied by the user to a right portion with respect to the center of the handle 23.

A seat 31 of the chair 93 is supported by a frame 32 so that the seat 31 can be inclined forward, rearward, leftward, and rightward of the chair 93.

A seat moving device 33 of the chair 93 includes a pair of elevating actuators 35 (that is, two elevating actuators 35) arranged at the left and right of the seat 31. A seat control device 34 has a function of providing control so that the seat 31 is inclined forward and the seat angle is displaced, by controlling the two elevating actuators 35. Further, the seat control device 34 also has a function of controlling a seat gradient so that a desirable gradient is provided leftward or rightward with respect to the seat 31 (or leftward or rightward of the chair 93) by changing (differentiating) the expansion lengths of the left and right elevating actuators 35 in control on the seat angle. A support control device 24 of the robot 92 has a function of calculating a gravity center position of the user in the left-right direction on the basis of the left handle load and the right handle load.

A process of controlling the seat gradient on the basis of the left handle load and the right handle load is described here. First, when the user grips the handle 23 with both hands, the handle load detector 27 detects the left handle load and the right handle load. For example, the left handle load is a handle load applied to the left portion of the handle 23 when the user grips the left portion with respect to the center of the handle 23 with the left hand. Also, the right handle load is a handle load applied to the right portion with respect to the center of the handle 23 when the user grips the right portion with the right hand.

Handle load information including the detected left handle load and right handle load is input to the support control device 24. The support control device 24 calculates the gravity center position of the user in the left-right direction on the basis of the left handle load and the right handle load.

Figure 13:
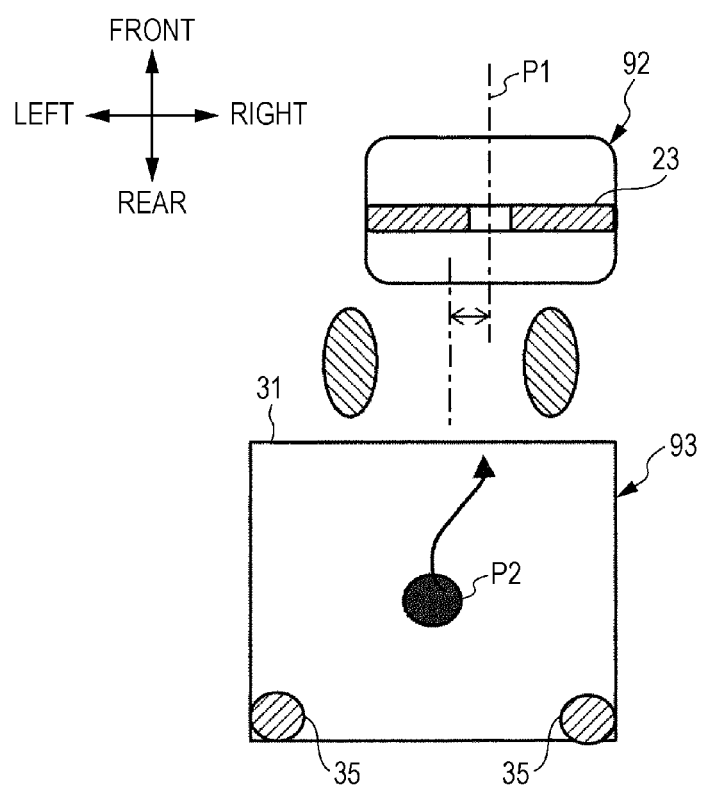
FIG. 13 is a schematic view showing the relationship among a robot, a chair, and a user according to the sixth embodiment.

For example, in a schematic view (a plan view) in FIG. 13, a center position in the left-right direction of the user is shifted from a center position P1 in the left-right direction of the robot 92. In this state, the left handle load is larger than the right handle load. The support control device 24 estimates a gravity center position P2 of the user in the left-right direction on the basis of the left and right handle loads. Then, the support control device 24 creates control information on a seat gradient so that the calculated gravity center position P2 of the user approaches the center position P1 in the left-right direction of the robot 92.

The support control device 24 instructs a communicator 28 to transmit the control information on the seat gradient by adding the control information on the seat gradient to support control information, to the chair 93. The support control information includes the movement speed of the seat 31 described in the aforementioned embodiment and the control information on the seat gradient.

The communicator 28 transmits the support control information to the chair 93. The control information on the seat gradient is, for example, the speed at which the seat 31 is inclined in the left-right direction, or the angle by which the seat 31 is inclined in the left-right direction.

The seat control device 34 controls the inclination (also called seat gradient) in the left-right direction by changing the expansion lengths of the two left and right elevating actuators 35 on the basis of the control information on the seat gradient included in the support control information input through a communicator 38, so that the gravity center position P2 of the user approaches the center position P1 in the left-right direction. To be specific, in the example shown in FIG. 13, the expansion length of the left elevating actuator 35 is set to be larger than the expansion length of the right elevating actuator 35, so that a gradient from the left to the right is provided. The control on the seat gradient is executed in addition to control on the seat angle (a forward inclination angle) based on the movement speed of the seat 31 of the chair 3 included in the support control information received from the robot 92. As the result, the gravity center position P2 of the user in the left-right direction moves forward and rightward, and approaches the center position P1 in the left-right direction of the robot 92.

As described above, by executing the gradient control on the seat 31 in the left-right direction in addition to the forward inclination control on the seat 31, the gravity center position P2 of the user in the left-right direction can approach the center position P1 of the robot 92 in the left-right direction. Accordingly, the posture can be more smoothly changed in stand-up motion of the user, and the physical burden can be decreased.

Seventh Embodiment

Next, a stand-up support system 101 according to a seventh embodiment of the present disclosure is described with reference to a control block diagram in FIG. 14. The same reference numerals are applied to configurations common to those of the stand-up support system 1 in the above-described first embodiment, and the descriptions are omitted. Hereinafter, points different from the stand-up support system 1 in the first embodiment are mainly described.

Figure 14:
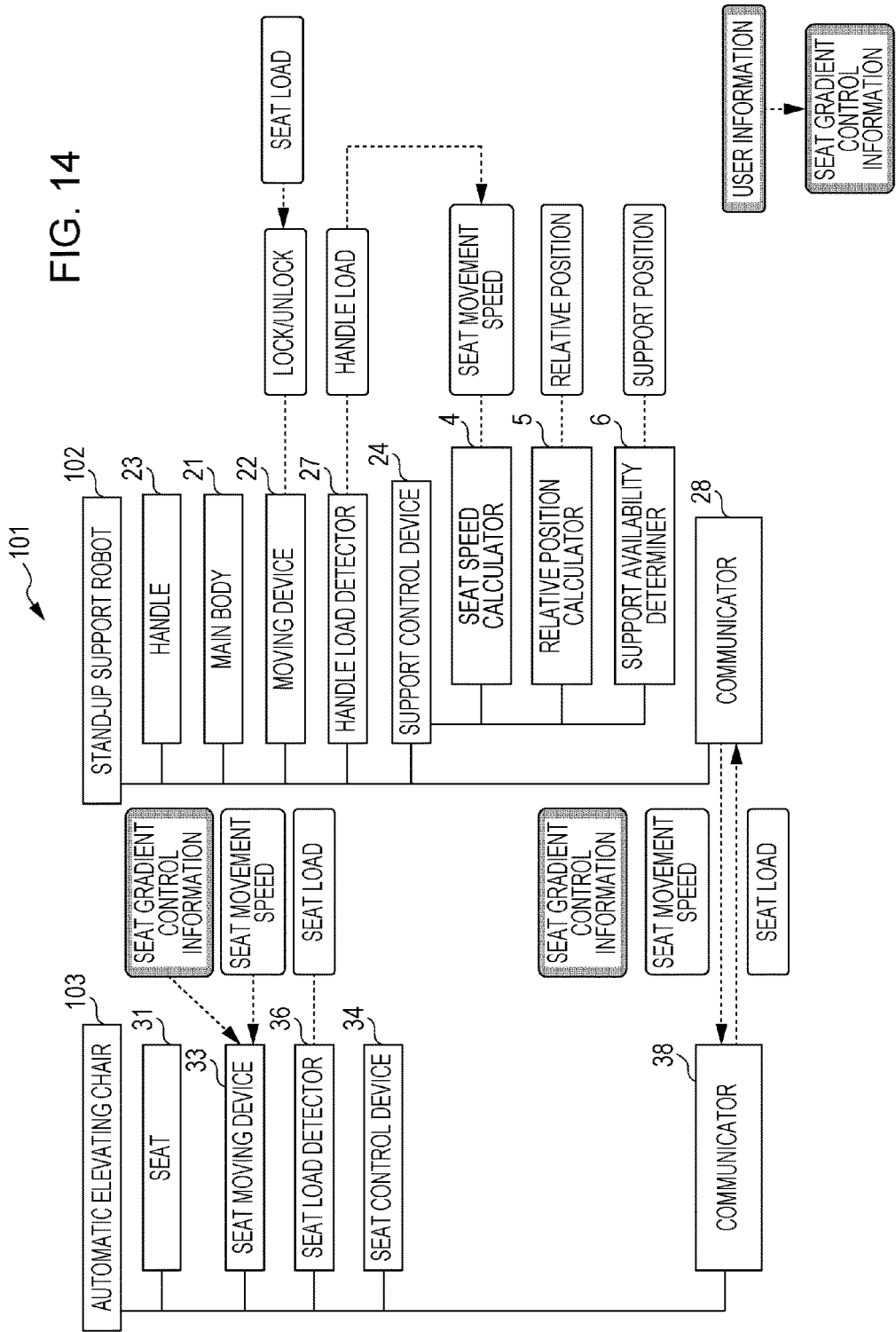
FIG. 14 is a control block diagram of a stand-up support system according to a seventh embodiment.

As shown in FIG. 14, the stand-up support system 101, corresponding to a living support system, includes a robot 102 corresponding to an autonomous mobile robot, and a chair 103 corresponding to an automatic elevating chair.

A support control device 24 of the robot 102 calculates a movement speed when a seat 31 is inclined forward, and adds the movement speed to support control information.

In this embodiment, the support control device 24 of the robot 102 further adds control information on a seat gradient for controlling the seat gradient in the left-right direction of the seat 31 of the chair 103 on the basis of previously set user information to the support control information, and transmits the support control information to the chair 103 through a communicator 28. For example, user information indicative of that one of the left and right legs is disabled is previously registered in the support control device 24. Hence, when stand-up support for the user is provided, the support control device 24 creates support control information including control information on a seat gradient which causes the seat 31 to be inclined leftward or rightward on the basis of the user information.

A seat control device 34 of the chair 103 controls the pair of left and right elevating actuators 35 on the basis of the control information on the seat gradient included in the support control information. Accordingly, the seat 31 can be inclined with a desirable seat gradient in the left-right direction of the seat 31, and proper stand-up support can be provided for the user with one of the left and right legs being disabled.

Eighth Embodiment

Next, a stand-up support system 111 according to an eighth embodiment of the present disclosure is described with reference to a control block diagram in FIG. 15. The same reference numerals are applied to configurations common to those of the stand-up support system 1 in the above-described first embodiment, and the descriptions are omitted. Hereinafter, points different from the stand-up support system 91 in the sixth embodiment are mainly described.

Figure 15:
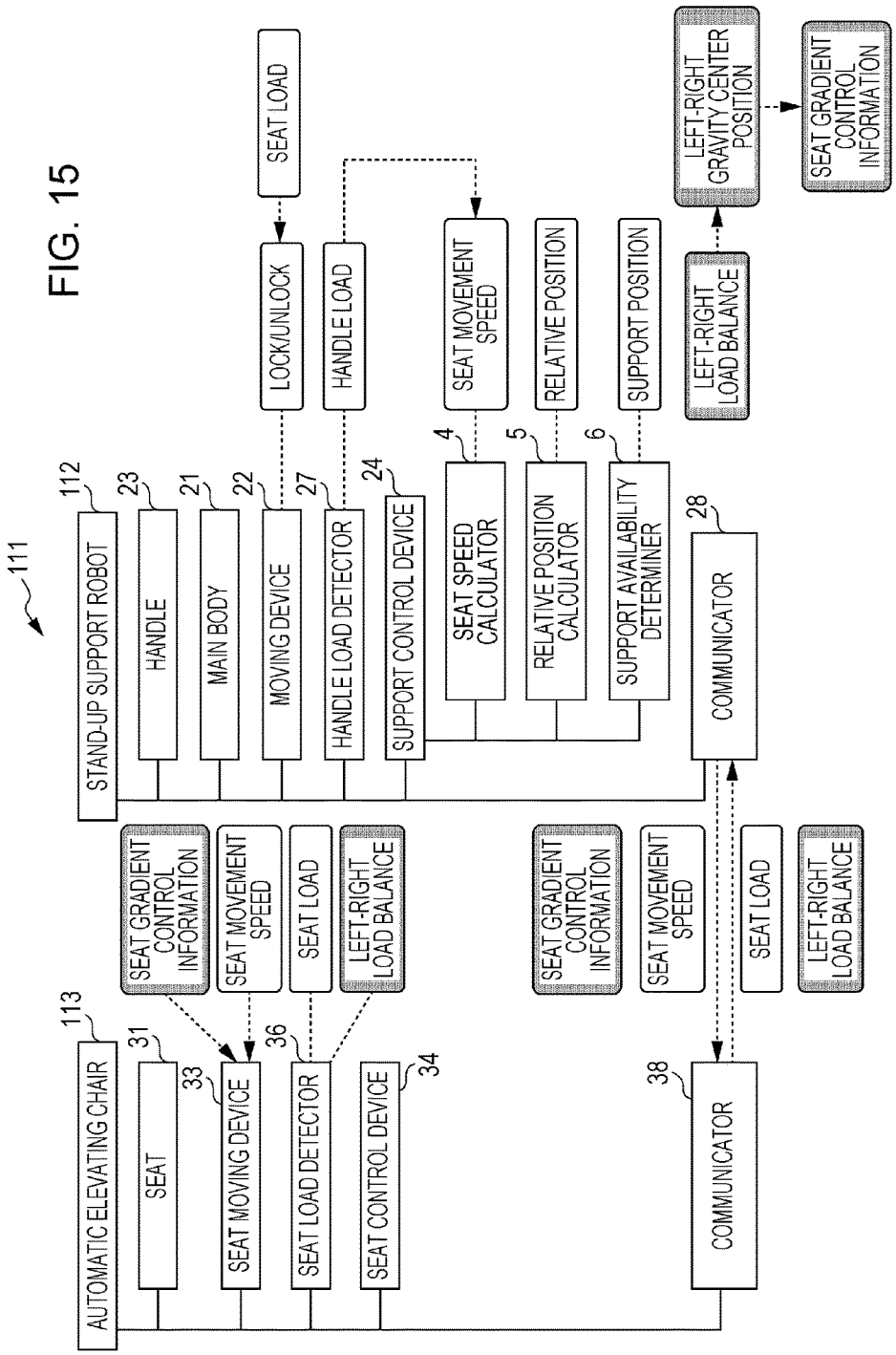
FIG. 15 is a control block diagram of a stand-up support system according to an eighth embodiment.

As shown in FIG. 15, the stand-up support system 111, corresponding to a living support system, includes a robot 112 corresponding to an autonomous mobile robot, and a chair 113 corresponding to an automatic elevating chair.

In the above-described sixth embodiment, the robot 92 can detect the handle loads respectively applied to the left and right portions of the handle 23. However, the eighth embodiment differs from the sixth embodiment in that the chair 113 detects a left-right load balance.

Figure 16:
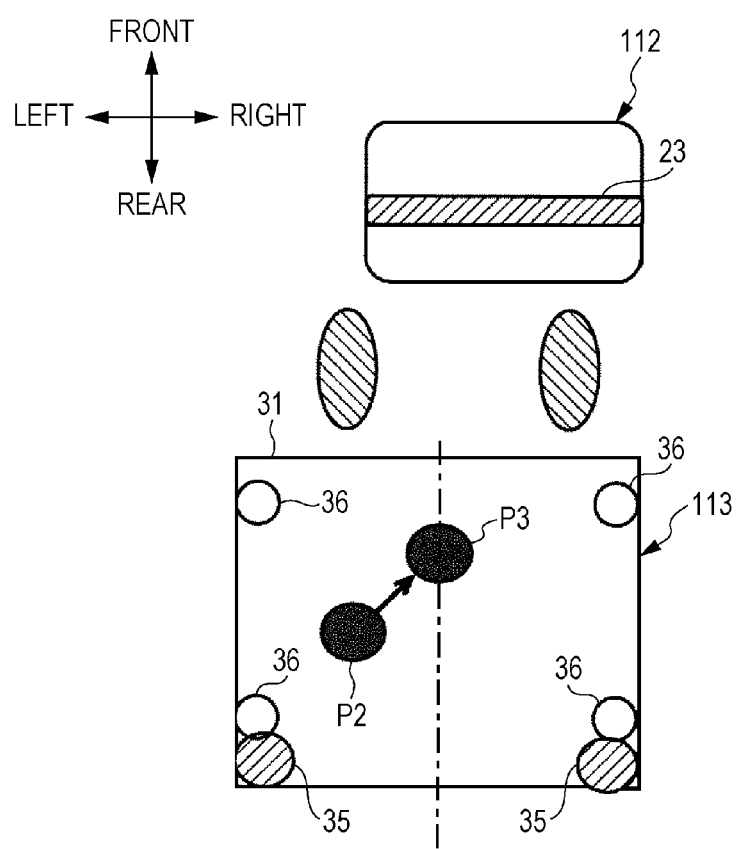
FIG. 16 is a schematic view showing the relationship among a robot, a chair, and a user according to the eighth embodiment.

For example, as shown in a schematic view (a plan view) in FIG. 16, the chair 113 is provided with, for example, a plurality of pressure sensors at four corners or at positions near the four corners of a rectangular seat 31, as a seat load detector 36. The positions near the four corners of the seat 31 are positions which can be assumed to be the four corners of the seat 31. Respective seat loads detected by seat load detectors (that is, the four pressure sensors) are input to a seat control device 34. The seat control device 34 calculates information relating to a load balance (serving as information on a left-right load balance) of the seat 31 in the left-right direction on the basis of the respective seat loads. The calculated information on left-right load balance is transmitted to the robot 112 through a communicator 38.

A communicator 28 of the robot 112 receives the information on left-right load balance transmitted from the chair. The communicator 28 outputs the received information on left-right load balance to a support control device 24.

The support control device 24 of the robot 112 calculates a gravity center position P2 of a user in the left-right direction on the basis of the information on left-right load balance received from the chair 113. The support control device 24 transmits control information on a seat gradient which causes the calculated gravity center position P2 of the user approaches a center position P3 in the left-right direction of the chair 113, as support control information, to the chair 113 through the communicator 28. The seat control device 34 controls the seat gradient by changing the expansion lengths of the two left and right elevating actuators 35 on the basis of the control information on the seat gradient included in the input support control information, so that the gravity center position P2 of the user approaches the center position P3 in the left-right direction.

The gradient control in the left-right direction of the seat 31 can be executed even by using the information on left-right load balance of the seat 31. Accordingly, the posture can be more smoothly changed in stand-up motion of the user, and the physical burden can be decreased.

Ninth Embodiment

Next, a stand-up support system 121 according to a ninth embodiment of the present disclosure is described with reference to a control block diagram in FIG. 17. The same reference numerals are applied to configurations common to those of the stand-up support system 1 in the above-described first embodiment, and the descriptions are omitted.

Figure 17:
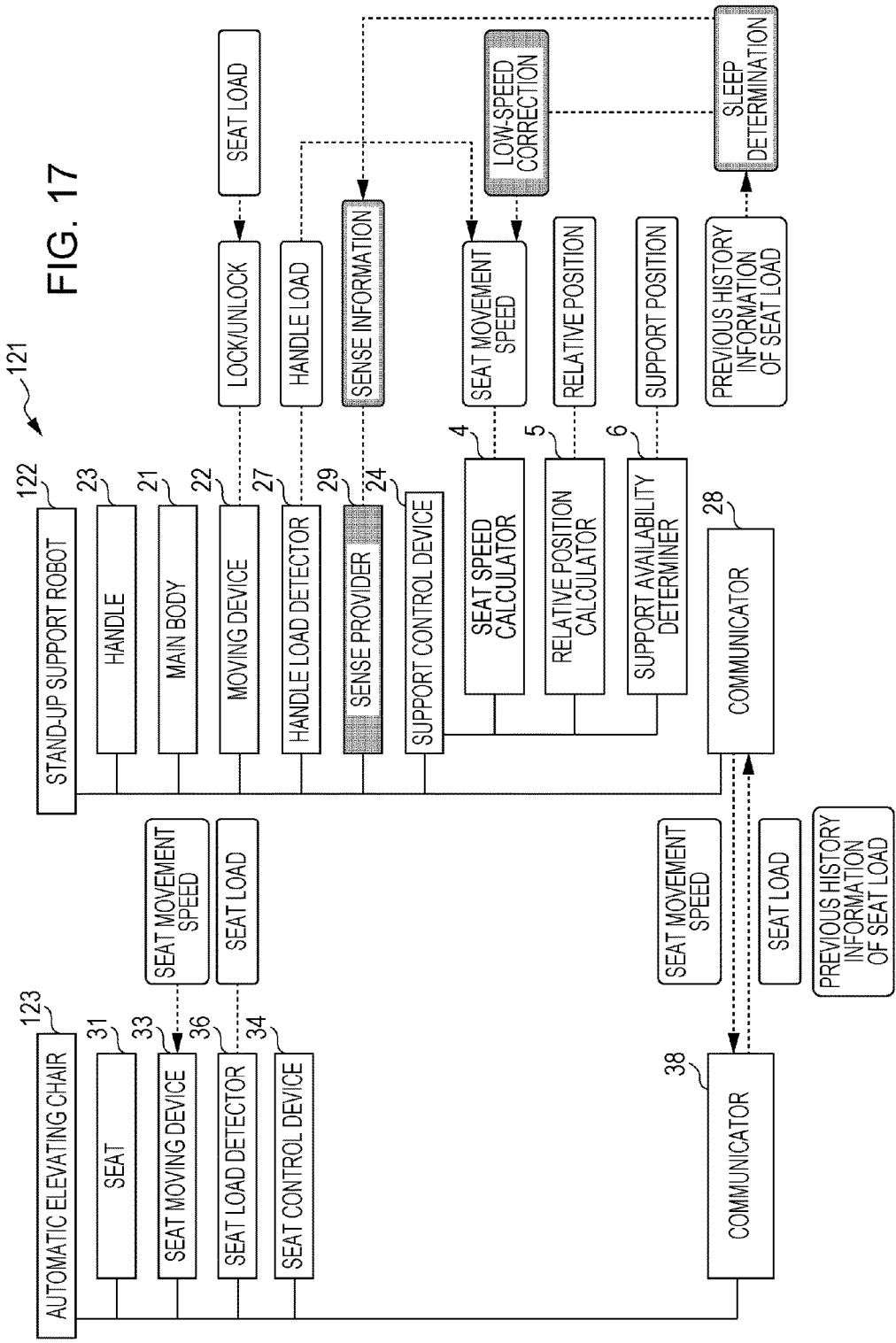
FIG. 17 is a control block diagram of a stand-up support system according to a ninth embodiment.

As shown in FIG. 17, the stand-up support system 121, corresponding to a living support system, includes a robot 122 corresponding to an autonomous mobile robot, and a chair 123 corresponding to an automatic elevating chair.

The robot 122 includes a sense provider 29 (a sense providing unit) that emits a sense signal to a user. The sense signal emitted by the sense provider 29 includes, for example, a visual sense signal and an auditory sense signal. The visual sense signal may employ any form as long as the information (a signal) can be visually recognized by the user. For example, the visual sense signal may be a signal expressing high/low of luminous intensity, or a signal expressing the difference in color of emitted light. The auditory sense signal may employ any form as long as the information (a signal) can be auditorily recognized by the user. For example, the auditory sense signal may be a signal expressing a sound, or a signal expressing large and small of the volume of a sound. Such a sense provider 29 may employ a light emitter or a speaker provided in a handle 23 of the robot 122.

A seat load detector 36 of the chair 123 detects a seat load every predetermined period. Seat load information in which the detected seat load is associated with the time at which the seat load is detected, is stored in a storage (not shown) such as a memory. Also, a seat control device 34 of the chair 123 calculates the difference between the time at which the seat load is detected and the current time. If the difference is larger than a previously set time interval, the seat load information is deleted from the storage. That is, seat load information detected during a predetermined period corresponding to the previously set time interval is stored in the memory.

The previously set time interval is, for example, a longer time interval than a time interval in which the seat load detector 36 executes the detection. Also, the previously set time interval may be set, for example, on the basis of the capacity of the memory.

When the seat control device 34 of the chair 123 receives a query for the seat load from the robot 122, the seat control device 34 causes the seat load detector 36 to detect the seat load in response to the query, and transmits seat load information including the detected seat load to the robot 122 through a communicator 38.

At this time, the seat control device 34 of the chair 123 stores seat load information in the memory before the reception of the query from the robot 122, and transmits the stored seat load information as history information to the robot 122 through the communicator 38. For example, the seat load information stored in the memory in a period from the reception of the query from the robot 122 to a predetermined time is transmitted as the history information to the robot 122.

That is, the history information indicates a change in seat load with time. The history information indicates a change in seat load in the period from the reception of the query until the predetermined time.

A support control device 24 of the robot 122 determines whether the user sitting on the chair 123 is sleeping or not on the basis of the received history information. The determination is made by referencing the history information and estimating the motion amount of the user on the basis of the change in seat load. If it is determined that the motion amount of the user is small and the user is sleeping, the support control device 24 controls the sense provider 29 so that the sense provider 29 emits a sense signal to the user.

With this configuration, the sleeping user can be urged to wake up by emitting the sense signal from the sense provider 29. Accordingly, surprise stand-up support for the sleeping user can be prevented, and the safety can be enhanced, for example, by preventing the user from falling.

Other various modifications can be applied to the stand-up support system 121 according to the ninth embodiment. For example, if the support control device 24 determines that the user is sleeping, the support control device 24 may add a lower movement speed than the seat movement speed calculated by a seat speed calculator 4 to support control information, and may instruct a communicator 28 to transmit this support control information to the chair 123. In such a modification, the stand-up support can be provided while the seat 31 is slowly inclined for the sleeping user, and surprise stand-up support can be prevented.

Also, for example, the support control device 24 may receive speed information including a movement speed of a seat 31 of the chair 123 from the chair 123 through the communicator 28, and the sense provider 29 may emit a sense signal distinguishably expressing high/low of the movement speed of the seat 31 included in the speed information received from the chair 123. Such a sense signal may be distinguishable depending on the color of emitted light such that a red-based light signal is output if the movement speed of the seat 31 is higher (faster) than a predetermined movement speed, and a yellow-based light signal is output if the movement speed of the seat 31 is lower (slower) than the predetermined movement speed.

With this configuration, the sense provider 29 emits a sense signal corresponding to the movement speed of the seat included in the received speed information.

Also, for example, a blue-based light signal may be output if the seat movement is stopped (that is, if the speed is zero). Alternatively, a voice signal or the like may be used instead of the light signal. With such a modification, the user can recognize the seat movement speed by the sense signal, and stand-up support can be executed while the user feels safe.

Alternatively, the sense provider 29 may emit a sense signal distinguishably expressing high/low of the movement speed at a gravity center position of the user. The movement speed at the gravity center position of the user may be calculated by the support control device 24 on the basis of the seat load information and the handle load. With this modification, since the sense provider 29 emits the sense signal corresponding to the movement speed at the gravity center position of the user, the user can recognize the movement speed at the gravity center position of the user by the sense signal, and the stand-up support can be executed while the user feels safe.

Tenth Embodiment

Next, a stand-up support system 131 according to a tenth embodiment of the present disclosure is described with reference to a control block diagram in FIG. 18. The same reference numerals are applied to configurations common to those of the stand-up support system 1 in the above-described first embodiment, and the descriptions are omitted.

Figure 18:
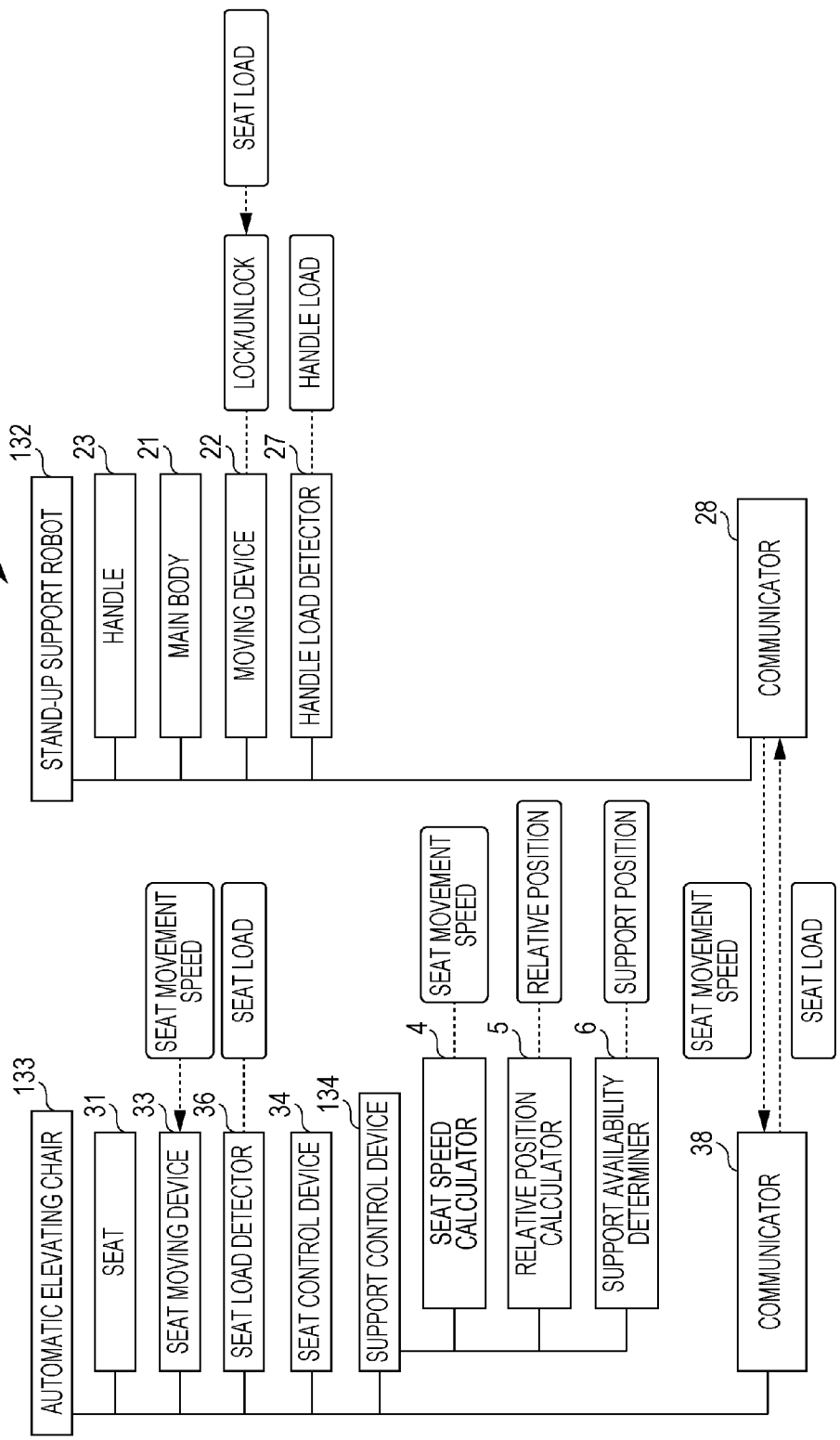
FIG. 18 is a control block diagram of a stand-up support system according to a tenth embodiment.

As shown in FIG. 18, the stand-up support system 131, corresponding to a living support system, includes a robot 132 corresponding to an autonomous mobile robot, and a chair 133 corresponding to an automatic elevating chair. The stand-up support system 131 differs from the stand-up support system 1 according to the above-described first embodiment mainly in that a support control device 134 is provided in the chair 133 instead of the robot 132. That is, the chair 133 includes the support control device 134. The support control device 134 includes a seat speed calculator 4, a relative position calculator 5, and a support availability determiner 6.

In the stand-up support system 131 according to the tenth embodiment with such a configuration, a process which supports a stand-up motion of a user is described with reference to a flowchart in FIG. 19. Also, in the flowchart in FIG. 19, the process in the robot 132 and the process in the chair 133 are shown in parallel, and transmission and reception of information between the robot 132 and the chair 133 are also shown.

Figure 19:
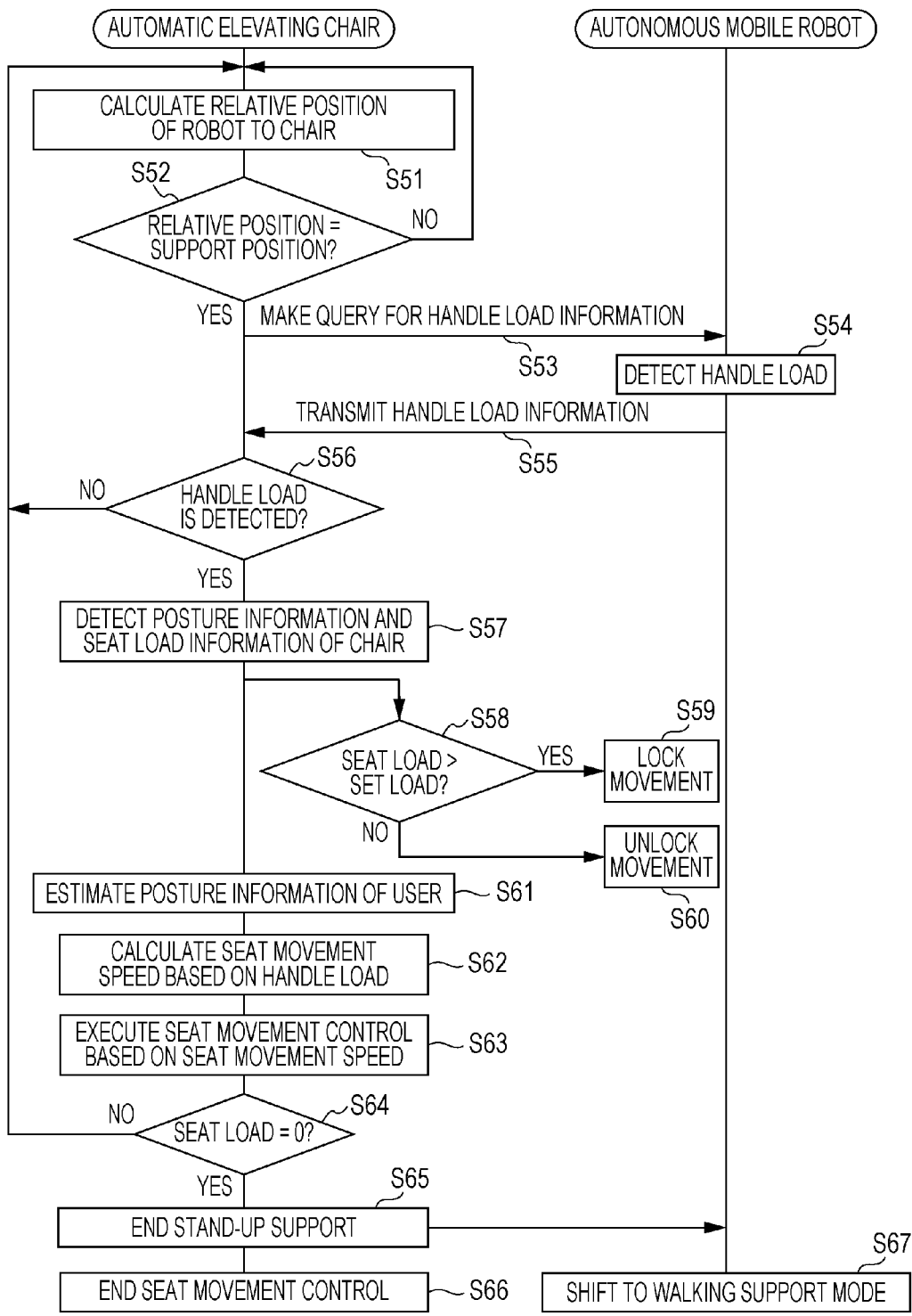
FIG. 19 is a flowchart showing a process of supporting a stand-up motion according to the tenth embodiment.

First, in step S51 in FIG. 19, the relative position calculator 5 in the support control device 134 of the chair 133 calculates a relative position of the robot 132 with respect to the chair 133.

Then, the support availability determiner 6 in the support control device 134 of the chair 133 determines whether the relative position of the robot 132 with respect to the chair 133 calculated by the relative position calculator 5 is located at a previously set support position or not (step S52). If it is determined that the relative position is not located at the support position, the processing from step S51 to step S52 is repetitively executed.

If it is determined that the relative position is located at the support position in step S52, the support control device 134 of the chair 133 makes a query (an information acquisition request) for the handle load information to the robot 132 through a communicator 38 (step S53).

A handle load detector 27 of the robot 132 which has received the information acquisition request through a communicator 28 detects a handle load (step S54). Handle load information including the detected handle load is transmitted to the chair 133 through the communicator 28 (step S55).

The support control device 134 of the chair 133 determines whether a handle load equal to or larger than a previously set load is detected or not on the basis of the handle load received from the robot 132 (step S56). In step S56, if the handle load equal to or larger than the set load is not detected, it is assumed that the user does not start the stand-up motion, and the processing from step S51 to step S55 is repetitively executed.

If it is determined that the handle load is detected in step S56, the support control device 134 of the chair 133 causes a seat angle detector 37 to execute a detection operation for an angle θ of the seat 31 through a seat control device 34, and causes a seat load detector 36 to execute a detection operation for a seat load (step S57). Information on the detected angle θ and information on the detected seat load of the seat 31 are input as posture information of the chair 133 and seat load information of the chair 133 to the support control device 134.

The support control device 134 of the chair 133 determines whether the seat load exceeds a previously set load or not (step S58). If it is determined that the seat load exceeds the set load, it is assumed that the user is sitting on the chair 133 or in the middle of the stand-up motion, and a lock instruction for wheels 25 of a moving device 22 is transmitted to the robot 132. In response to this instruction, the wheels 25 of the moving device 22 in the robot 132 are locked, and forward movement of the robot 132 is restricted (step S59). In contrast, if it is determined that the seat load is equal to or smaller than the set load in step S58, it is assumed that the user substantially completes the stand-up motion, and an unlock instruction for the wheels 25 of the moving device 22 is transmitted to the robot 132. In response to this instruction, the wheels 25 of the moving device 22 in the robot 132 are unlocked (step S60).

Then, the support control device 134 of the chair 133 estimates posture information of the user on the basis of information on the seat angle, or on the basis of information on the seat angle and information on the seat load (step S61).

Then, the seat speed calculator 4 in the support control device 134 of the chair 133 calculates a speed of the seat angle in seat movement of the chair 133 on the basis of the handle load, by using a previously set algorithm (step S62).

The seat control device 34 of the chair 133 causes a seat moving device 33 to execute seat movement control by using the speed of the seat angle received from the seat speed calculator 4 (step S63). Accordingly, the seat 31 of the chair 133 moves to be inclined forward, a force of pushing up the hip of the user obliquely forward and upward acts on the user, and hence the stand-up motion of the user can be supported.

Then, the support control device 134 of the chair 133 determines whether the seat load is 0 (zero) or not (step S64). If the seat load is not zero, it is determined that the user does not complete the stand-up motion, and the processing from step S51 to step S64 is executed. That is, the seat movement of the chair 133 is controlled by using the speed of the seat angle calculated on the basis of a newly detected handle load. The processing from step S51 to step S64 is repetitively executed until it is determined that the seat load is zero in step S64.

Then, if it is determined that the seat load is zero in step S64, it is assumed that the user is completely separated from the chair 133, the stand-up support processing is ended (step S65), and the seat movement control on the chair 133 is ended (step S66). Then, the robot 132 in a state in which the standing user grips the handle 23 is switched from a stand-up support mode to a walking support mode (step S67), and the support for the walking motion of the user is started.

As described above, even if the support control device 134 is included in the chair 133 instead of the robot 132, the movement control is executed on the seat 31 of the chair 133 on the basis of the handle load detected by the robot 132, and hence the stand-up support for the user can be executed.

The support control device may be provided in any of the robot and the chair. Alternatively, a portion of the function owned by the support control device may be provided in the robot and the other portion may be provided in the chair.

Also, in any of the stand-up support systems according to the above-described second to ninth embodiments, the support control device may be provided in the chair similarly to the stand-up support system 131 according to the tenth embodiment.

In the description on the embodiments, the several examples are provided for the stand-up support system of the present disclosure. However, the stand-up support system of the present disclosure is not limited to those embodiments.

For example, the seat moving device 33 that moves the seat 31 of the chair 3 is not limited to the elevating actuator 35 and may be any device as long as the device displaces the angle θ of the seat 31. Alternatively, the seat moving device may displace the angle θ of the seat 31 of the chair 3, and also move the seat 31 vertically or horizontally.

The handle 23 of the robot 2 may employ any form as long as the form allows the user to place his/her hands thereon and apply a load thereto.

Also, instead of calculating the gravity center position of the user on the basis of the seat load and the handle load, a posture image of a user may be acquired with an image sensor or the like and the gravity center position may be calculated on the basis of the posture image.

Also, the lock/unlock operation on the wheels 25 of the moving device 22 in the robot 2 is not limited to the operation on the basis of the seat load. For example, the support control device 24 may learn a change in stand-up posture of a user, and may control operation timings for lock and unlock on the basis of the learned result. By unlocking the robot 2 and allowing the forward movement to start in the middle of the stand-up motion of the user, the motion can be smoothly guided from the stand-up motion to the walking motion. In this point of view, the support control device 24 may execute learning.

For example, while the user makes the stand-up motion, if a force in the vertical direction is almost not detected as the handle load and a force is applied in the front-rear direction, the robot 2 may be temporarily unlocked and the position of the robot 2 may be moved in accordance with the force in the front-rear direction. Accordingly, the robot 2 can be located at a position at which the user can easily stand up. If a force in the vertical direction is detected while the robot 2 is temporarily unlocked, the robot 2 is locked again and hence the safety can be kept.

Also, by temporarily unlocking the robot 2 as described above, the position to which the robot 2 has moved may be stored as the position at which the user can easily stand up. When the stand-up support is executed next, the stored position may be used as the initial position of the relative position of the robot 2 with respect to the chair 3.

The handle load detector 27 may also have a function of detecting a load in the horizontal direction (for example, the front-rear direction of the robot) in addition to the load in the vertical direction with respect to the floor, and the lock/unlock operation on the wheels 25 of the moving device 22 may be controlled on the basis of detection values of the force in the vertical direction and the force in the front-rear direction. If the handle load detector 27 detects a force of a set value or larger in the front-rear direction, the unlock operation may be executed.

Also, the robot 2 may be slowly moved in the horizontal direction (for example, the orientation in the front-rear direction of the robot) in which the force acts by the moving device 22 on the basis of the magnitude of the detected force in the front-rear direction. Accordingly, for example, the robot 2 can be slowly moved forward in accordance with the magnitude of the force by which the user intends to move forward. By locating the robot 2 at the position at which the user can easily stand up, smooth stand-up support can be provided. Also, the robot 2 may slowly move forward during the stand-up motion of the user. Also, after the stand-up motion of the user is completed, the walking motion of the user can be supported by detecting the force in the front-rear direction with the handle load detector 27, and controlling the movement of the robot 2 with the moving device 22 (for example, movement speed control) on the basis of the magnitude of the force in the front-rear direction.

Also, the robot 2 may be provided with a microphone. While the handle load is detected, if the support control device 24 recognizes a predetermined voice (for example, "one, two, three") through the microphone, the movement of the robot 2 may be locked and stopped. Accordingly, in a case in which the user suddenly stands up, the risk of falling due to the movement of the robot 2 can be reduced.

Also, the support control device 24 may learn the characteristics of the user on the basis of information on the left-right balance of the handle load of the robot 2 or the front-rear/left-right balance of the seat load of the chair 3, and the support position to be provided next may be set at a corrected position in the left-right and front-rear directions.

Also, in the above-described embodiments, control on a specific support operation is started if the support availability determiner 6 determines that the relative position of the robot 2 with respect to the chair 3 is located at the support position. However, when information is transmitted/received or an information acquisition request is made between the robot and the chair, the support availability determiner 6 may make determination whether the relative position is located at the support position or not every transmission/reception of information or every information acquisition request between the robot and the chair. If it is determined that the relative position is located at the support position, the support availability determiner 6 may emit an instruction for transmission/reception of information or an information acquisition request between the robot and the chair.

Also, the case in which the support control device is provided in the robot or the chair has been described as the example; however, the support control device may be provided in an external device other than the robot and the chair. Also, the support control device may be provided in a cloud. In the case in which the support control device is provided in the external device other than the robot and the chair, information detected or calculated by the robot or the chair is received by the support control device through a communication network, and information created by the support control device is transmitted to the robot or the chair through the communication network. The external device includes a communicator that transmits and receives information to and from the robot or the chair through the communication network.

Also, the robot and the chair include communicators that each transmit and receive information to and from the external device. The information to be transmitted and received is the information described in the above-described embodiments. For example, the communicator of the robot transmits the handle load detected by the handle load detector to the external device.

Also, for example, the communicator of the chair transmits the posture information, the seat load information, the history information, etc., to the external device.

Also, for example, the communicator of the external device receives the handle load from the robot.

Also, for example, the communicator of the external device receives the posture information, the seat load information, the history information, etc., from the chair.

Also, for example, the communicator of the external device transmits the support control information to the chair.

If some embodiments are properly combined from among the above-described various embodiments, advantages owned by those embodiments can be attained.

The present disclosure can be applied to a living support system and a living support method that support a stand-up motion of a user sitting on a chair.

For example, a living support system including the stand-up support robot and the stand-up support chair according to the present disclosure can decrease the physical burden in standing up from a chair serving as the starting point of living action, and can provide stand-up support through smooth posture transition. Accordingly, the present disclosure is useful if applied to a living support system for a user who requires support for a stand-up motion, such as an elderly person.

What is claimed is:

1. A living support system connected to a chair including a movable seat through a communication network, comprising:
   a robot including
      a main body,
      a moving device that moves the main body in a freestanding state,
      a handle provided at the main body and configured to be gripped by a user, and
      a handle load detector that detects a handle load applied to the handle by the user;
   a support control device that controls movement of the movable seat for a stand-up motion of the user sitting on the chair, on the basis of the detected handle load, wherein the support control device includes (i) a relative position calculator that calculates a relative position of the robot with respect to the chair and (ii) a support availability determiner that determines that stand-up support is available if the relative position calculated by the relative position calculator is located at a previously set support position; and
   a communicator that transmits support control information including a movement speed at which the chair moves the movable seat, to the chair through the communication network,
   wherein the support control device further includes a seat speed calculator that calculates a speed at which the movable seat is inclined with respect to a floor on which the chair is placed, as the movement speed on the basis of the detected handle load; and
   wherein, if the support availability determiner determines that the robot is located at the support position, the communicator transmits the support control information including the movement speed calculated by the seat speed calculator to the chair.

2. The living support system according to claim 1, wherein, if the support availability determiner determines that the robot is located at the support position, the communicator receives seat load information, from the chair, which includes a seat load which is applied to the movable seat by the user and detected by the chair, and
   wherein the support control device locks movement of the moving device if the seat load included in the received seat load information is larger than the previously set seat load, and the support control device unlocks the movement of the moving device if the seat load included in the seat load information becomes equal to or smaller than the previously set seat load.

3. The living support system according to claim 2, wherein the handle load detector detects a handle load in a vertical direction and a handle load in a horizontal direction with respect to a floor on which the robot is arranged, as the handle load applied to the handle, and
   wherein the support control device unlocks the movement by the moving device and causes the moving device to move the robot in the horizontal direction if the handle load in the horizontal direction detected by the handle load detector is a set value or larger.

4. The living support system according to claim 1, wherein, if the support availability determiner determines that the robot is located at the support position, the communicator receives seat load information, from the chair, which includes a seat load which is applied to the movable seat by the user and detected by the chair, and
   wherein the support control device locks movement of the moving device at the support position, calculates a gravity center position of the user on the basis of the handle load detected by the handle load detector and the seat load included in the seat load information, and the support control device unlocks the movement of the moving device if the gravity center position satisfies a previously set first set condition.

5. The living support system according to claim 4, wherein the support control device causes the moving device to move the main body in a direction away from the chair in accordance with the gravity center position after the movement is unlocked.

6. The living support system according to claim 1, wherein the robot further includes
   a posture information acquirer that acquires posture information of the user sitting on the chair,
   wherein the support control device corrects the support position on the basis of the posture information of the user input from the posture information acquirer.

7. The living support system according to claim 1, wherein, if the support availability determiner determines that the robot is located at the support position, the communicator receives seat load information, from the chair, which includes a seat load which is applied to the movable seat by the user and which is detected by the chair, and
   wherein the seat speed calculator calculates the movement speed of the sheet on the basis of the handle load and the seat load included in the received seat load information.

8. The living support system according to claim 1, wherein the seat speed calculator calculates a value that is proportional to the handle load, as the movement speed.

9. The living support system according to claim 1, wherein, if the support availability determiner determines that the robot is located at the support position, the communicator receives seat load information, from the chair, which includes a seat load which is applied to the movable seat by the user and which is detected by the chair,
   wherein the seat control device calculates a gravity center position of the user on the basis of information on the handle load and the seat load included in the received seat load information, and
   wherein the seat speed calculator calculates the movement speed of the movable seat of the chair so that a movement speed at the gravity center position of the user satisfies a previously set second set condition.

10. The living support system according to claim 1, wherein the chair includes a seat moving device that inclines the movable seat forward of the chair, and inclines the movable seat leftward or rightward of the chair, wherein the handle load detector detects a left handle load applied to a left portion with respect to the center of the handle by the user, and a right handle load applied to a right portion with respect to the center of the handle by the user, wherein the support control device calculates a gravity center position of the user in a left-right direction of the chair on the basis of the left handle load and the right handle load, and adds control information on a seat gradient by which the movable seat is inclined leftward or rightward of the chair so that the gravity center position of the user approaches the center of the robot, to the support control information, and wherein the support control device causes the seat moving device of the chair to control the seat gradient on the basis of the control information on the seat gradient included in the support control information.

11. The living support system according to claim 1,
wherein the chair includes a seat moving device that inclines the movable seat forward of the chair, and inclines the movable seat leftward or rightward of the chair, wherein the support control device adds control information on a seat gradient by which the movable seat is inclined leftward or rightward of the chair, to the support control information on the basis of previously set user information, and wherein the support control device causes the seat moving device of the chair to control the seat gradient on the basis of the control information on the seat gradient in the support control information.

12. The living support system according to claim 1,
wherein the chair includes a seat moving device that inclines the movable seat forward of the chair, and inclines the movable seat leftward or rightward of the chair, wherein, if the support availability determiner determines that the robot is located at the support position, the communicator receives information, from the chair, on a left-right load balance relating to a load balance of the seat in a left-right direction of the chair detected by the chair, wherein the support control device calculates a gravity center position of the user in the left-right direction on the basis of the received information on the left-right load balance, and adds control information on a seat gradient by which the movable seat is inclined leftward or rightward of the chair so that the gravity center position of the user approaches the center in the left-right direction of the chair, to the support control information, and wherein the support control device causes the seat moving device of the chair to control the seat gradient on the basis of the control information on the seat gradient included in the support control information.

13. The living support system according to claim 1,
wherein, if the support availability determiner determines that the robot is located at the support position, the communicator receives history information, from the chair, on a seat load which is applied to the movable seat by the user and which is detected by the chair, wherein the support control device determines whether the user is sleeping or not on the basis of the received history information, and if the support control device determines that the user is sleeping, the support control device adds a lower movement speed than the movement speed of the movable seat calculated by the seat speed calculator, to the support control information.

14. The living support system according to claim 1, further comprising:
a sense provider that emits a sense signal to the user,
wherein, if the support availability determiner determines that the robot is located at the support position, the communicator receives history information, from the chair, on a seat load which is applied to the movable seat by the user and detected by the chair, and wherein the support control device determines whether the user is sleeping or not on the basis of the received history information, and if the support control device determines that the user is sleeping, the sense provider emits the sense signal.

15. The living support system according to claim 1, further comprising:
a sense provider that emits a sense signal to the user,
wherein the communicator further receives speed information, from the chair, which includes the movement speed of the movable seat, and
wherein the sense provider emits a sense signal corresponding to the movement speed of the seat included in the received speed information.

16. The living support system according to claim 1, further comprising:
a sense provider that emits a sense signal to the user,
wherein, if the support availability determiner determines that the robot is located at the support position, the communicator receives seat load information, from the chair, which includes a seat load which is applied to the movable seat by the user and detected by the chair, and
wherein the support control device calculates a gravity center position of the user on the basis of the handle load and the seat load included in the received seat load information, and the sense provider emits a sense signal corresponding to a movement speed at the gravity center position of the user.

17. The living support system according to claim 1,
wherein the handle load detector detects a handle load in a vertical direction with respect to a floor on which the robot is arranged, as the handle load applied to the handle, and
wherein, the support control device causes the chair to control the movement of the movable seat on the basis of the detected handle load in the vertical direction.

18. The living support system according to claim 1,
wherein the robot includes: the support control device; and the communicator.

19. The living support system according to claim 1, further comprising:
an external device connected to the robot and the chair through the communication network,
wherein the external device includes the support control device and the communicator.

20. The living support system according to claim 19,
wherein the robot includes a communicator that transmits the detected handle load to the external device, and
wherein the support control device acquires the handle load received by the communicator in the external device from the robot.

21. The living support system according to claim 1,
wherein the support control device causes the chair to move the movable seat on the basis of the calculated movement speed included in the transmitted support control information.

22. A living support method of a living support system connected to a chair including a movable seat through a communication network, wherein the living support system includes a robot having a main body, a moving device that moves the main body in a freestanding state, a handle provided at the main body and configured to be gripped by a user, and a handle load detector that detects a handle load applied to the handle by the user, and wherein the living support method comprises:

calculating a relative position of the robot with respect to the chair;

determining that stand-up support is available if the relative position calculated by the relative position calculator is located at a previously set support position;

controlling movement of the movable seat for a stand-up motion of the user sitting on the chair, on the basis of the handle load detected by the robot;

transmitting support control information including a movement speed at which the chair moves the movable seat, to the chair through the communication network; and wherein, the controlling further includes calculating a speed at which the movable seat is inclined with respect to a floor on which the chair is placed, as the movement speed on the basis of the detected handle load; and wherein, if it is determined that the robot is located at the support position, the communicator transmits the support control information including the movement speed calculated by the seat speed calculator to the chair.

23. A living support system comprising:

a chair having a movable seat;

a robot including a main body, a moving device that moves the main body in a freestanding state, a handle provided at the main body and configured to be gripped by the user, and a handle load detector that detects a handle load applied to the handle; and an external device connected to the robot and the chair through the communication network, wherein the external device includes a support control device that controls movement of the movable seat for a stand-up motion of the user sitting on the chair, on the basis of the handle load detected by the robot, wherein the support control device includes (i) a relative position calculator that calculates a relative position of the robot with respect to the chair and (ii) a support availability determiner that determines that stand-up support is available if the relative position calculated by the relative position calculator is located at a previously set support position, and a communicator that transmits support control information including a movement speed at which the chair moves the movable seat, to the chair through the communication network, and wherein the support control device includes a seat speed calculator that calculates a speed at which the movable seat is inclined with respect to a floor on which the chair is placed, as the movement speed on the basis of the handle load detected by the robot, and wherein, if the support availability determiner determines that the robot is located at the support position, the communicator transmits the support control information including the movement speed calculated by the seat speed calculator to the chair.

24. The living support system according to claim 23, wherein the robot further includes a communicator that transmits the detected handle load to the external device, wherein the communicator in the external device further receives the handle load transmitted from the robot, and wherein the seat speed calculator of the support control device calculates the speed at which the movable seat is inclined, as the movement speed on the basis of the received handle load.

\* \* \* \* \*